United States Patent [19]

Dage et al.

[11] Patent Number: 5,275,012

[45] Date of Patent: Jan. 4, 1994

[54] CLIMATE CONTROL SYSTEM FOR ELECTRIC VEHICLE

[75] Inventors: Gary A. Dage, Southfield; Brian R. Kelm, Northville; Andrew J. Klapp, Trenton, all of Mich.

[73] Assignee: Ford Motor Company, Dearborn, Mich.

[21] Appl. No.: 1,707

[22] Filed: Jan. 7, 1993

[51] Int. Cl.[5] ............................................. F25B 41/00
[52] U.S. Cl. ................................... 62/208; 62/228.1; 62/239; 219/202; 237/2 A
[58] Field of Search ..... 237/2; 237/12.3A; 237/12.3B; 219/202, 203, 219/204; 62/160, 181, 183, 228, 229, 208, 215, 226, 228.1, 190, 239; 165/42, 30, 43; 236/91

[56] References Cited

U.S. PATENT DOCUMENTS

| | | | |
|---|---|---|---|
| 4,357,988 | 11/1982 | Hudson et al. | 165/26 |
| 4,364,237 | 12/1982 | Cooper et al. | 62/160 |
| 4,425,676 | 1/1984 | Claypole | 62/133 |
| 4,667,480 | 5/1987 | Bessler | 62/180 |
| 4,856,286 | 8/1989 | Sulfstede et al. | 62/89 |
| 4,870,833 | 10/1989 | Matsuda et al. | 62/134 |
| 4,877,081 | 10/1989 | Ohtsu | 165/30 |
| 4,907,416 | 3/1990 | Fujii | 62/180 |
| 5,008,803 | 4/1991 | Iida | 364/148 |

FOREIGN PATENT DOCUMENTS 56-60718 5/1981 Japan.
58-167223 10/1983 Japan.

OTHER PUBLICATIONS

"Climate Control for Electric Vehicles", by John Dieckmann, et al, SAE Paper No. 910250, Feb. 1991.

"The Development of an Automatic Air Conditioner with an Electronically-Controlled Compressor", by M. Fukubayashi, et al, ISAE Review, vol. 12, No. 3, 1991, pp. 69-74.

"Evaluation of an Electrically Driven Automotive Air Conditioning System Using a Scroll Hermetic Compressor with a Brushless DC Motor", by Hidemitsu Akabane, et al, SAE Paper No. 890308, Feb. 27-Mar. 3, 1989.

"Improved Vehicle Heating with the Use of PTC Ceramic", by Jeffrey A. Curhan, SAE Paper No. 900220, Feb. 26-Mar. 2, 1990.

"Air Conditioning Electric Vehicles with an Electronically Driven Variable Speed Scroll Type Compressor", by Susmu Ikeda, et al, SAE Paper 901738, Sep. 17-20, 1990.

Primary Examiner—Henry A. Bennet
Attorney, Agent, or Firm—Roger L. May; Richard D. Dixon

[57] ABSTRACT

A climate control system for an electric vehicle includes a programmed microcomputer for controlling the pre-conditioning of the vehicle prior to usage as well as heating, ventilating and air conditioning of the vehicle under normal operating conditions. The microcomputer responds to a plurality of vehicle operator inputs and sensor inputs and provides outputs to control the speed of the compressor, condenser fan and blower fan, and the position of a temperature blend door and a Fresh Air/Recirculating Air door to optimize the use of electrical energy.

18 Claims, 23 Drawing Sheets

CLIMATE CONTROL SYSTEM FOR ELECTRIC VEHICLE

TECHNICAL FIELD

This invention relates to a climate control system for an electric vehicle and more particularly to a system for pre-conditioning and for maintaining a comfortable vehicle interior environment while optimizing the use of electrical energy.

BACKGROUND ART

Supporting a conventional heating, ventilating and air conditioning (HVAC) systems in an electric vehicle poses problems because power consumed in operating the HVAC system may significantly affect the range and performance of the vehicle. Systems have been proposed which attempt to solve these problems through use a heat pump cycle for vehicle heating and/or employing a compressor driven by a variable speed motor for cooling, all for the purpose of reducing power consumption. It has also been proposed to use power from commercial electrical supply outlets to provide a pre-cooling feature prior to departing for highway usage of the vehicle. While such systems reduce power consumption by the HVAC system, further improvement in energy management are needed in order to insure acceptance of the electric powered vehicle by the public.

SUMMARY OF THE INVENTION

In view of the above, it is an object of the present invention to provide a climate control system for an electric vehicle which provides occupant comfort during normal operation on the vehicle traction batteries while minimizing power consumption by placing limitations on the maximum and minimum interior temperature of the vehicle and by controlling the speed of operation of one or more of the power consuming components of the system.

It is another object of the present invention to provide a climate control system which pre-conditions the vehicle interior over a predetermined interval of time, if the vehicle is connected to a battery charging supply and the traction batteries are fully charged, to thereby improve occupant comfort upon entry.

It is another object of the present invention to provide a climate control system for an electric vehicle wherein energy is conserved by limiting the cooling and heating of the interior of the vehicle to a predetermined temperature when maximum cooling and maximum heating respectively are commanded by the operator of the vehicle.

In accordance with the present invention a climate control system is provided which includes a preheat/precool feature for pre-conditioning the vehicle interior while it is connected to a 220 VAC supply. This conserves vehicle battery power and driving range by minimizing climate control system power requirements while operating under traction battery power. During normal operation of the system, battery power is conserved by limiting the maximum and minimum temperature which can be commanded by the operator, by lowering the compressor speed under appropriate operating conditions and by controlling the speed of various fans or blowers. During A/C modes of operation the blend door is set to the maximum cool position. During heater operation the and blend door setting is controlled as a function of ambient temperature as well as discharge air temperature. Also under various vehicle operating conditions such as low battery voltage or wide open throttle operation the compressor and heater are shut down.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
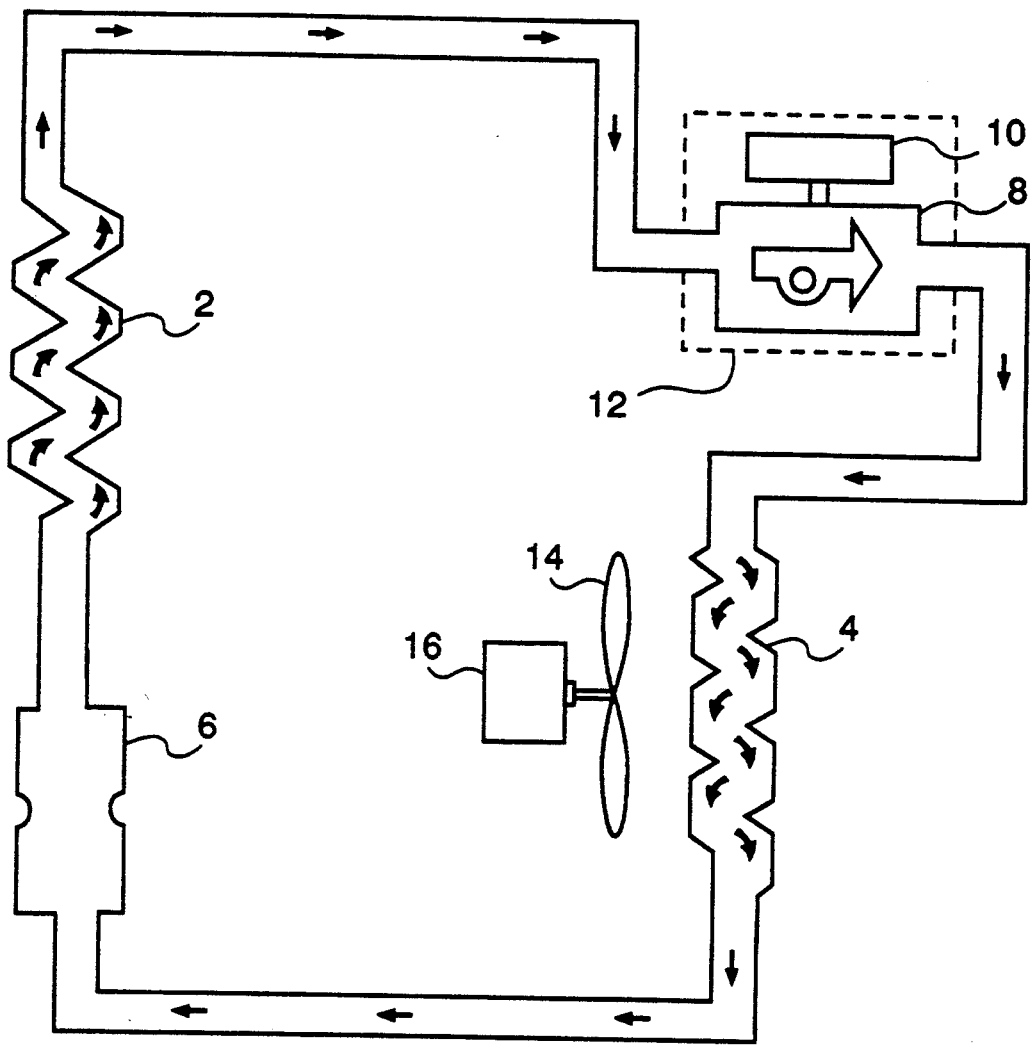
FIG. 1 is a schematic diagram of a refrigerant circuit which forms a portion of the climate control system of the present invention.

Referring now to the drawings and initially to FIG. 1, the climate control system of the present invention includes an evaporator 2, condenser 4, a restricting device 6, and an air conditioner compressor 8 all of which are serially connected to circulate refrigerant through a hermetically sealed refrigeration circuit. The compressor 8 is driven by a variable speed motor 10 and compresses gaseous refrigerant to raise its pressure. The compressor 8 and motor 10 are preferably a single unit 12, such as for example the Sanden Semi-Hermetically sealed compressor, in order to eliminate shaft seal refrigerant leakage problems. The refrigerant flows from the compressor 8 to the condenser 4 where the refrigerant gives up heat and condenses to a liquid. The high pressure liquid refrigerant expands as it passes through the restriction device 6 and flows to the evaporator 2. The cool liquid refrigerant in the evaporator 2 removes heat from the air passing through the evaporator with the heated refrigerant from the evaporator flowing, as a gas, back to the compressor 10 to repeat the cycle. A condenser fan 14 is driven by a motor 16 to pull outside air over the condenser 4 to lower its temperature.

Figure 2:
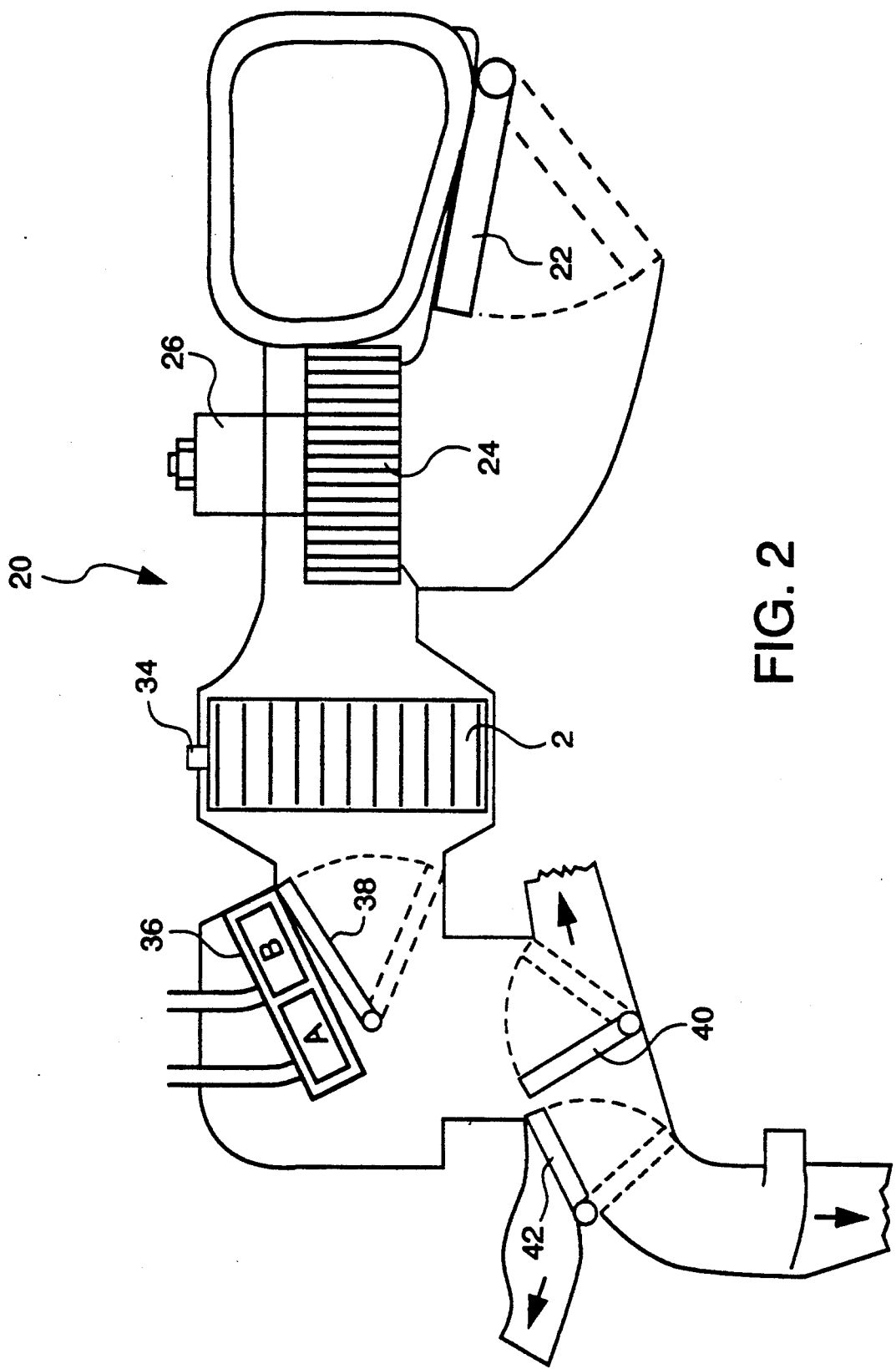
FIG. 2 is a schematic diagram of air flow in the climate control system of the present invention.

Referring now to FIG. 2, the evaporator 2 is located in an air delivery assembly generally designated 20 which communicates with the interior and exterior of the vehicle. A Fresh/Recirculate (F/R) door 22 located in the assembly 20 controls the mix of raw air from the outside of the vehicle and recirculated air from the inside of the vehicle. The door 22 is shown in a position where the inside air is recirculated. The dotted line position represent the 100% outside air position. A blower fan 24 driven by a blower motor 26 forces the air mixture over the evaporator 2. Though not shown in FIG. 2, an ambient temperature sensor 30 is appropriately mounted on the exterior of the vehicle for monitoring the temperature of the outside air while an in-vehicle temperature sensor 32 appropriately mounted in the vehicle passenger compartment monitors the interior temperature. An evaporator temperature sensor 34 monitors the temperature of the evaporator 2.

The climate control system includes a PTC (Positive Temperature Coefficient) heater 36 having a core divided into two equal segments A and B which are selectively controllable. One segment of the heater core is energized for low heat requirements and both segments are energized for high heat requirements. A temperature blend door 38 is actuable to obtain a desire mixture of heated and cooled air, while a panel/floor door 40 and a panel/defrost door 42 are actuable to direct air to the floor, to one or more instrument panel registers, or toward the windshield for defrosting purposes.

Figure 3A:
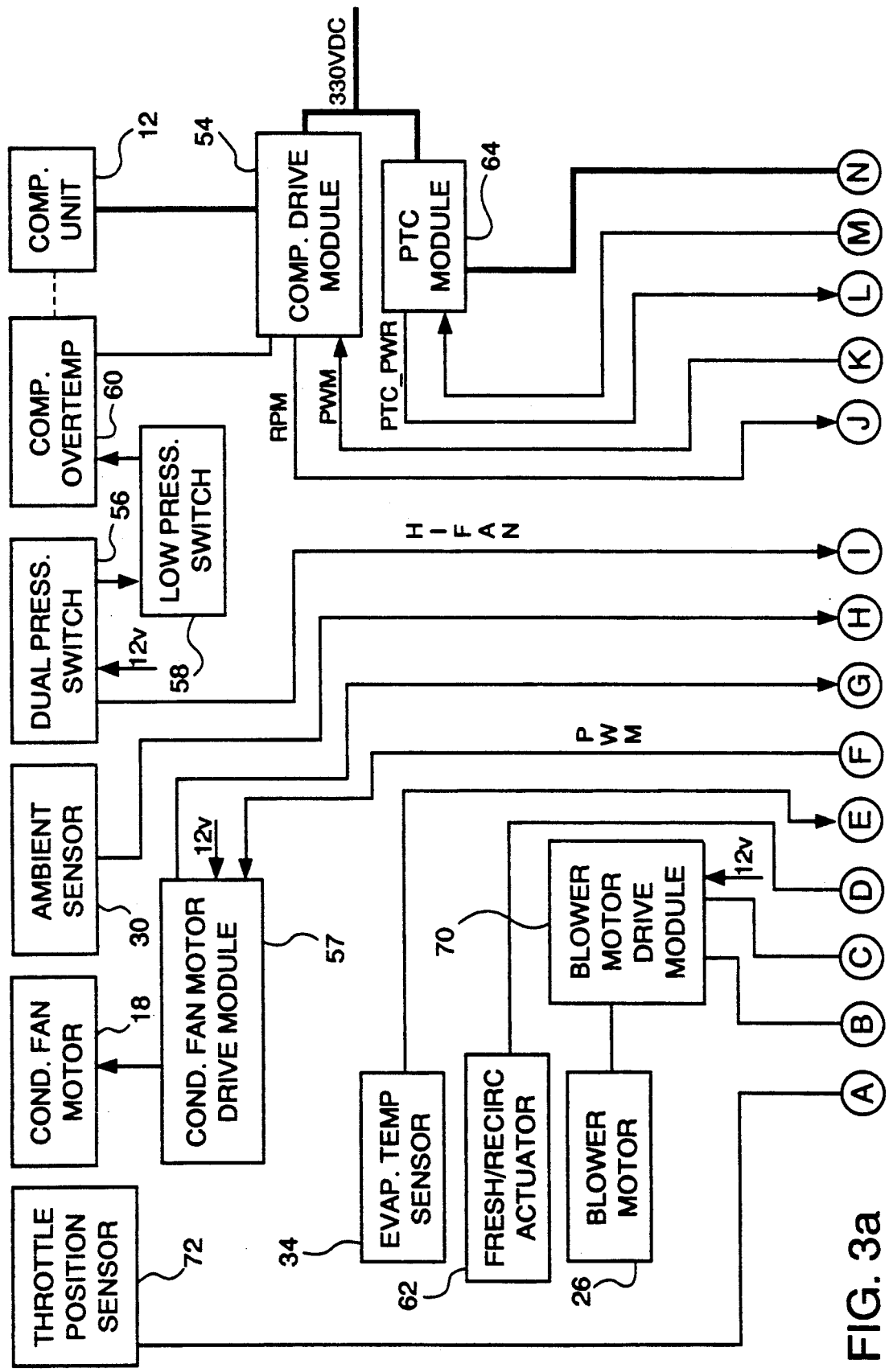
FIGS. 3a and 3b are a block diagram of the climate control system of the present invention.
Figure 3B:
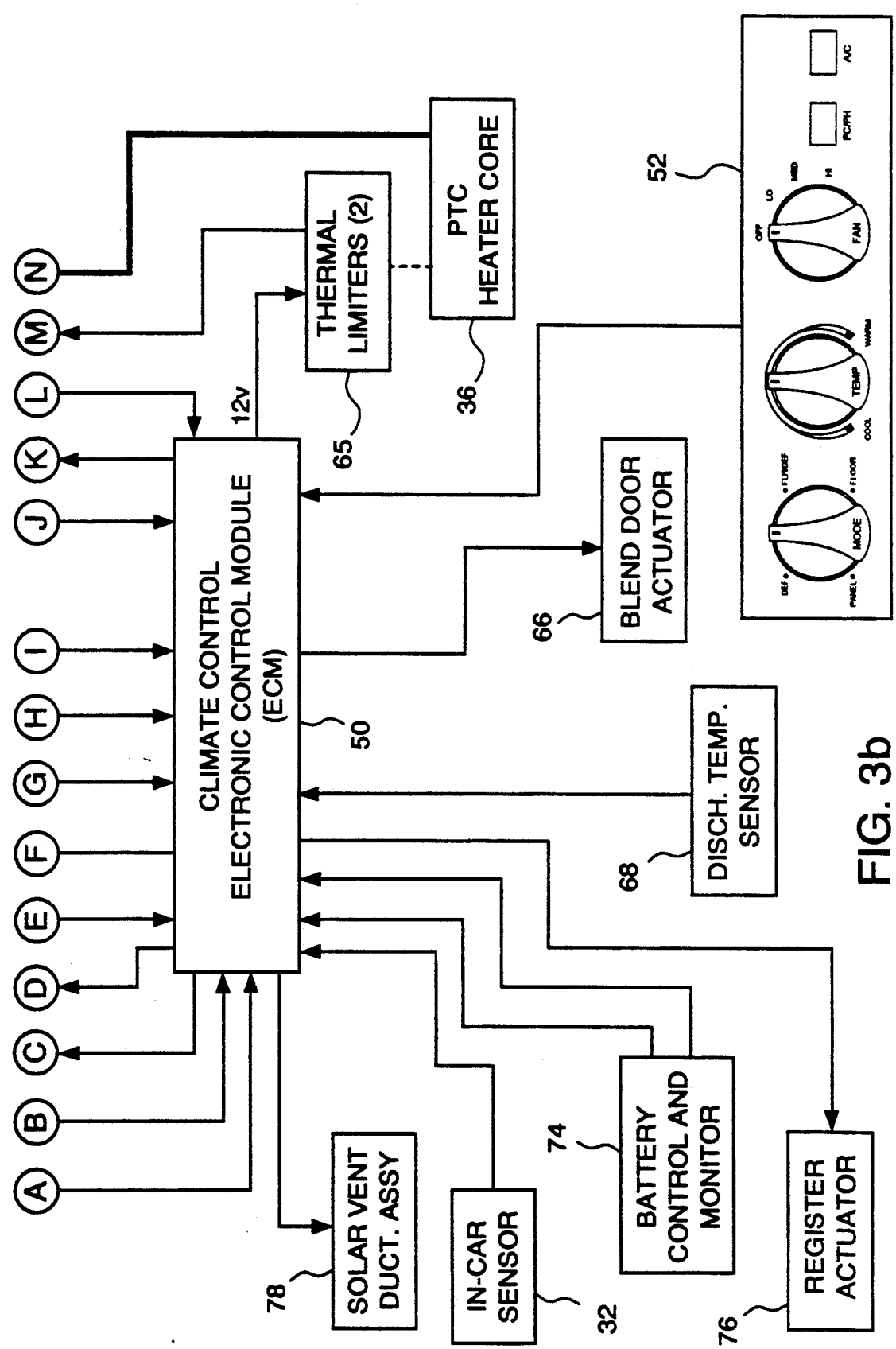
Figure 4:
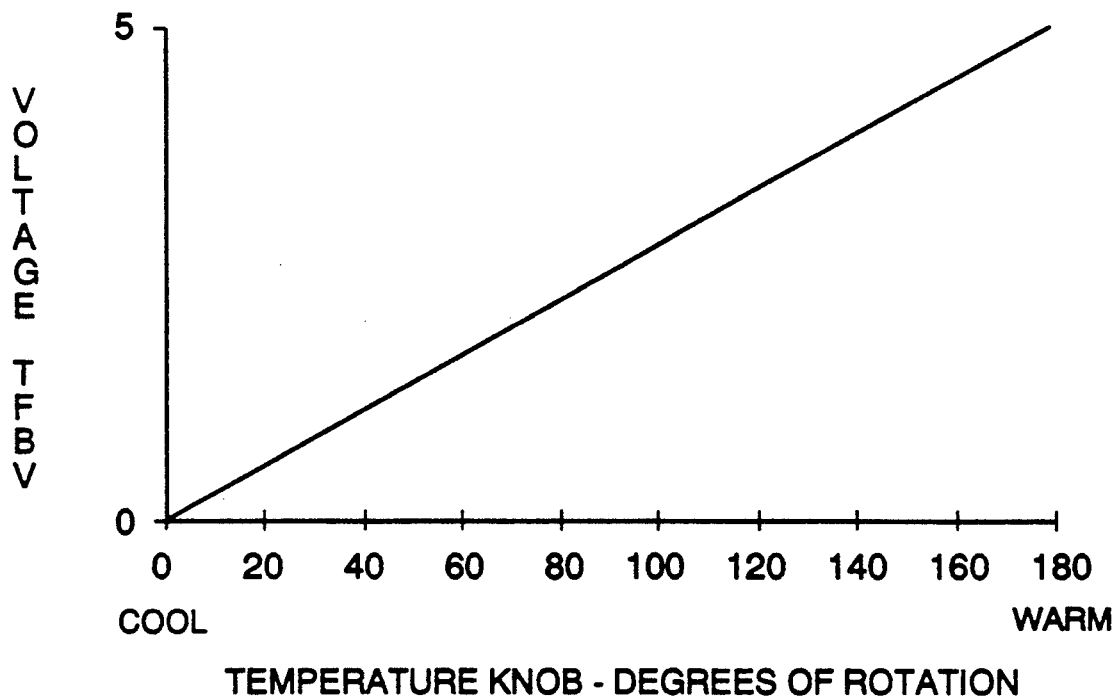
FIGS. 4 and 5 are charts of voltage versus rotation angle of the temperature and mode controls respectively, which are used in the present invention.
Figure 5:
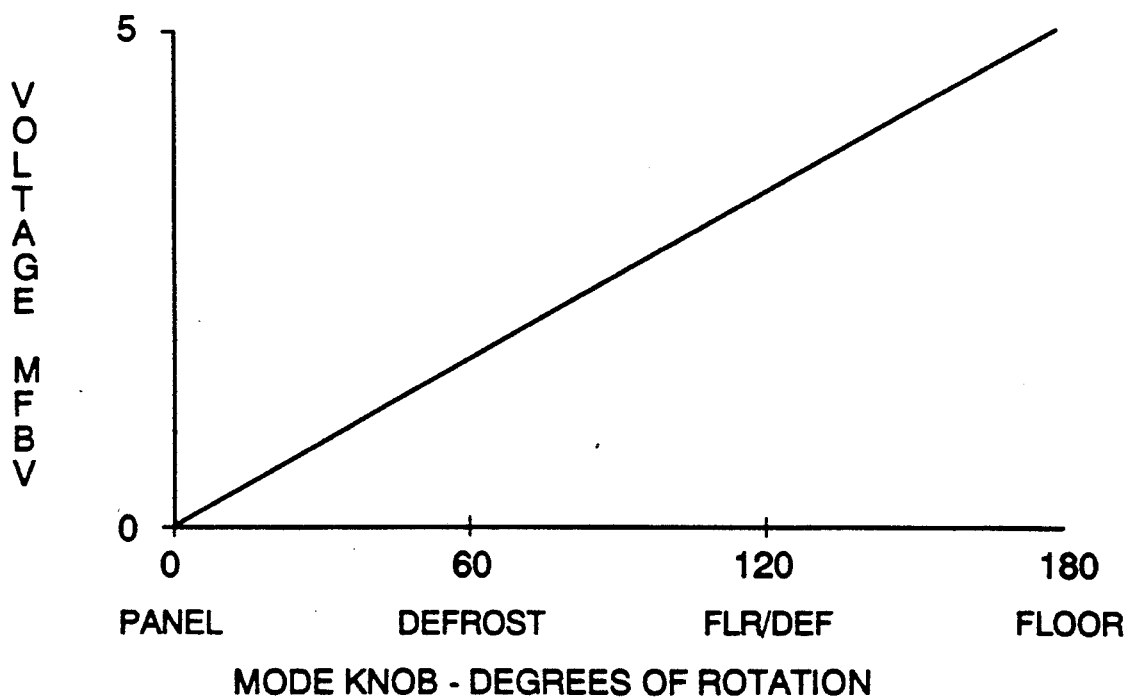

Referring now to FIGS. 3a and 3b, the climate control system of the present invention further includes a programmable electronic control module (ECM) generally designated 50 which receives inputs from the aforementioned sensors 30, 32, and 34 as well as from a control assembly 52. Preferably, the assembly 52 include knobs or selectors identified by the indicia MODE, TEMP and FAN, and push-button switches such as those identified by the indicia A/C, and PC/PH, all of which are actuable by the vehicle operator to provide input commands to the ECM 50. The TEMP selector may control the wiper of a potentiometer to provide a voltage input command to the ECM 50 which varies with the degree of rotation of the selector in accordance with the chart shown in FIG. 4. The TEMP selector is rotatable from a maximum COOL position at 0° of rotation where a voltage of 0.85 volts is input to the ECM 50, to a maximum WARM position at 180° of rotation where a voltage of 4.15 volts is input to the ECM. Similarly, the MODE selector or knob may control the wiper of a potentiometer to provide a voltage input command to the ECM 50, as shown in FIG. 5, to select the different modes of operation such as PANEL(0°), DEFROST(60°), FLOOR/DEFROST (FLR/DEF)(120°) and FLOOR(180°). In addition the assembly 52 provides discrete input to the ECM 50 from the A/C switch for commanding an air conditioning operation, from the PC/PH switch to command a pre-cool/pre-heat operation, and from the blower selector for commanding LO, MED and HI blower speeds. An OFF blower speed position commands a system OFF condition.

The compressor motor 10 is connected with a 330 VDC supply through a compressor drive module 54. The module 54 delivers a variable voltage to the motor of the compressor unit 12 as a function of the duty cycle of a pulse width modulation (PWM) command from the ECM 50. A dual function pressure switch 56 installed on the high pressure side of the refrigerant system prevents the compressor from operating if the system refrigerant pressure is below a predetermined minimum or if the compressor discharge pressure is above a predetermined maximum. If the compressor discharge pressure exceeds normal operating limits, the switch 56 sends a signal designated HIFAN to the ECM 50 which in response thereto will apply a PWM signal to a module 57 to drive the condenser fan motor 18 at high speed until the abnormal pressure condition no longer exists. A low pressure cut-out switch 58 is installed in the low pressure side of the refrigerant system to prevent the compressor 8 from running if the compressor suction is below a predetermined pressure. The compressor 8 also includes a switch 60 which disables the compressor during an over-temperature condition. The switches 56,58 and 60 serially connect a 12 VDC supply from the ECM 50 to the module 54 and shut down the compressor motor 8 under the aforementioned conditions by disconnecting the 12 VDC supply. The module 54 provides an input to the ECM 50 designated RPM which is proportional to the rotational speed of the compressor motor 8.

Figure 6:
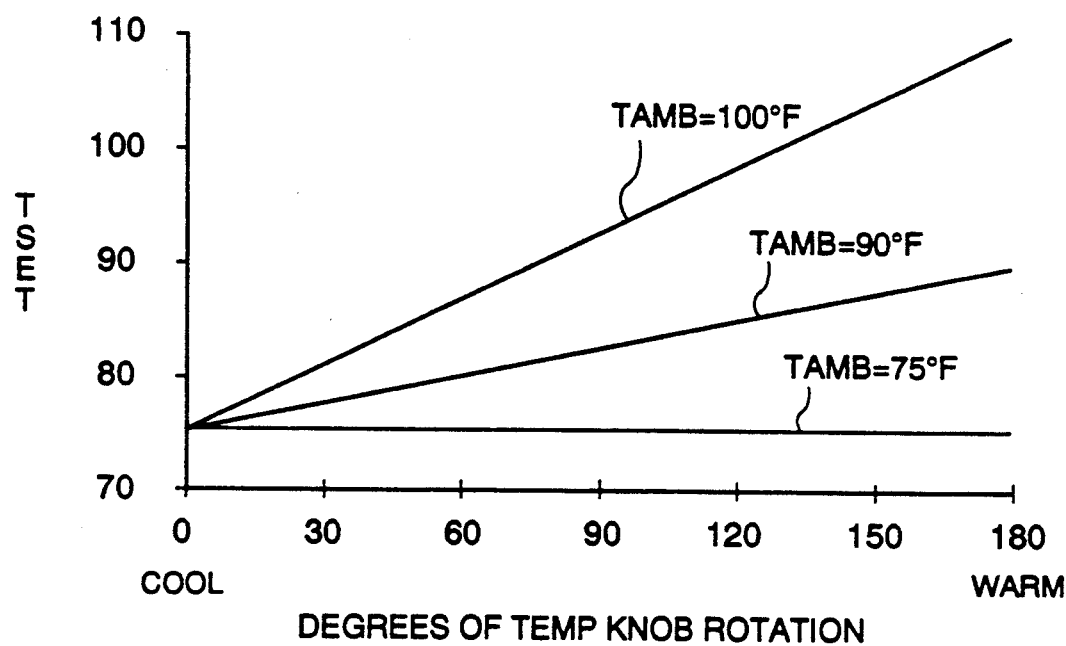
FIG. 6 is a chart of set temperature versus rotation angle of the temperature control during compressor modes of operation for three predetermined ambient temperatures.

The duty cycle of the PWM command to the compressor drive module 54 from the ECM 50 is based on calculations in accordance with equation (1) and (2) below. The climate control software in the ECM 50 calculates an interior temperature set point (TSET) based on equation (1). As indicated in equation (1) TSET is a function of the amount of temperature selector rotation between the extreme positions of COOL and WARM, and the ambient temperature as supplied by the sensor 30. Equation (1) converts the desired temperature input by the operator to a temperature value representing the temperature assigned to the COOL position, for example, 75° F., plus a percentage of the difference between the COOL position temperature and the WARM position temperature, where the WARM position temperature is assumed to be equal to the ambient temperature (TAMB). The amount added to 75° F. thus depends on the amount of angular rotation and the ambient temperature. Typical TSET values as a function of knob rotation are depicted in the chart of FIG. 6 for three ambient temperatures, namely 75°, 90° and 110° F. If desired, the charts shown in FIG. 6 may be stored in the memory of the ECM 50 in the form of look up tables so that set temperatures for any knob rotation may be determined though look up and interpolation routines well known to those skilled in the art.

$$TSET = [(TFBV - TFBVMIN)/(TFBVMAX - TFBVMIN)]*(TSETMAX - TSETMIN) + TSETMIN \quad (1)$$

Where:
TFBV = Temperature potentiometer feedback voltage (FIG. 4)
TAMB = Ambient Temperature
TFBVMIN = Minimum feedback voltage from temperature potentiometer
TFBVMAX = Maximum feedback voltage from the temperature potentiometer
TSETMIN = Minimum in-car temperature set point with temperature selector in maximum COOL position. For Compressor modes TSETMIN = 75 degrees.
TSETMAX = Maximum in-car temperature set point with temperature selector in maximum WARM position. For Compressor modes, TSETMAX = -TAMB Using TSET and equation (2) below, the software on the ECM 50 calculates an air conditioning value number, VALUE_AC, which dictates the compressor speed via the PWM command signal. VALUE_AC is also used to control an actuator 62 to position the F/R door 22 to a position which either introduces raw outside air or causes the in-car air to be recirculated.

$$VALUE\_AC = OFFSETAC + K5*(TSET - TSETMIN) + K6*(TSETMIN - TAMB) + K7*(TSET - TINCAR) \quad (2)$$

Where:
OFFSETAC = 0 to 255 HEX calibration offset constant
K5, K6, K7 = 0.0 to 10.0, calibration constants
TAMB = Ambient temperature
TINCAR = In-Car temperature The calibration constants OFFSETAC, K5, K6, and K7 are determined during testing of the system.

Figure 7:
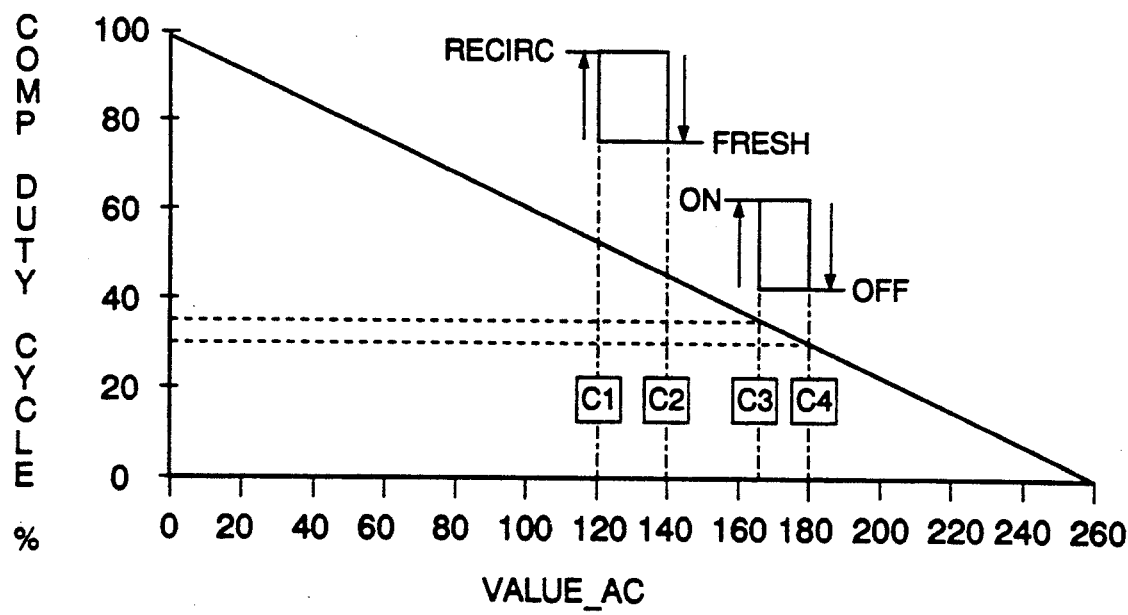
FIG. 7 is a chart of the compressor duty cycle versus VALUE_AC and shows the positioning of the fresh/recirculating door relative to VALUE_AC.

FIG. 7 depicts the compressor percent duty cycle versus the VALUE_AC. Also shown is the positioning of the F/R door at the calibration switch points C1 and C2. The F/R door is closed for values of 120 or less and open for values of 140 or more. For values between 120 and 140 the F/R door is either closed or open depending upon whether the values are increasing or decreasing to provide hysteresis. Calibration switch points C3 and C4 establish the value at which the compressor is turned ON or OFF. In other words the compressor is turned ON with an initial duty cycle of 35% if VALUE_AC drops below 165 and remains ON until VALUE_AC rises above 180 at which value the compressor is turned OFF. When an A/C mode is selected, the ECM 50 positions the blend door in the maximum cool position.

Thus, the speed of the compressor and the position of the F/R door are a function not only of the difference between the actual and desired temperature in the vehicle but also as a function of the ambient temperature (TSETMAX) as well as the minimum (coldest) temperature permitted in the vehicle as reflected in TSET. As a result, the compressor speed is decreased to reduce power consumption under mild ambient conditions or when less than maximum cooling is commanded by the operator.

The ECM 50 monitors the speed of the compressor motor 8 via the RPM input and whenever the speed exceeds a recommended limit, for example, 7,000 RPM, VALUE_AC is incremented, to reduce the compressor speed, by adding the term in equation 2A to equation 2.

$$K8*(RPM - RPMMAX) \quad (2A)$$

Where:
K8 = 0.0 to 10.0, calibration constant
RPM = Compressor RPM
RPMMAX = Maximum compressor RPM The ECM 50 monitors the input from evaporator temperature sensor 34 and if the temperature of the evaporator (TEVAP) falls below some maximum value TEVAPMAX, for example 50° F., the compressor speed is reduced by adding the term shown in Equation (2B) to Equation (2) to increment VALUE_AC upwardly.

$$K9*(TEVAPMAX - TEVAP) \quad (2B)$$

where:
K9 = 0.0 to 10.0 calibration constant
TEVAP = Evaporator temperature
TEVAPMAX = Evaporator temperature upper limit.

The PTC heater core segments A and B are turned on as determined by the ECM 50 through control signals (not shown) which are applied to a PTC control module 64 which connect a 330 volt DC supply to the appropriate segment(s) of the PTC heater core 36. As previously indicated, one segment of the heater core is turned on for low heat requirements and both segments are turned on for high heat requirements.

The module 64 includes built-in short circuit protection circuitry for disconnecting the appropriate segment of the heater core 36 from the 330 volt DC supply if the current drawn by a segment exceeds approximately 30 amps. Once an over-current condition has occurred, the 330 VDC remains disconnected until the module 64 is reset from the ECM 50. To determine whether the short circuit condition is a transient condition caused by moisture on the PTC core, the ECM 50 attempt to turn on the PTC core 5 times with an OFF wait time of 5 seconds between ON cycles. Thermal limiters 65 monitor the segments of the core and provide an input to the ECM 50 if an over-temperature condition exist.

Figure 8:
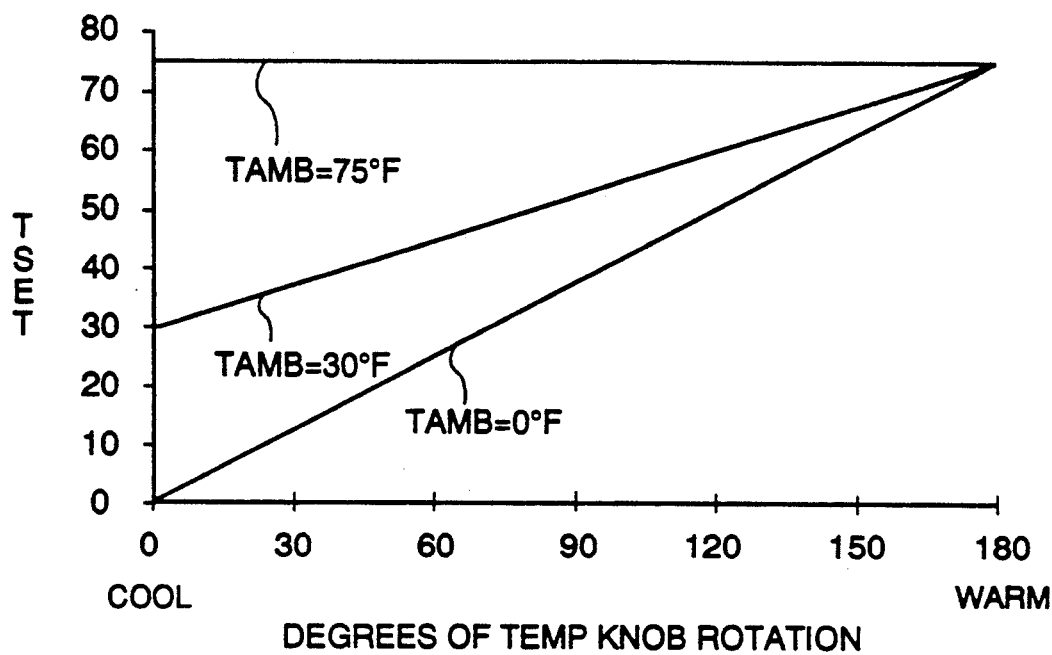
FIG. 8 is a chart of set temperature versus rotation angle of the temperature control during the heater mode of operation for three predetermined ambient temperatures.

In addition to controlling whether one or both segments of the PTC heater 36 is to be energized, the ECM 50 controls the position of the blend door 38 through a blend door actuator 66. The ECM 50 calculates the temperature set point using Equation (1). For the PTC heating modes, TSETMAX is equal to 75° F. If the calculated TSET is greater than 75° F. then TSET is set to equal 75° F. TSET values versus degrees of temperature knob rotation for three ambient temperatures of 0° F., 30° F. and 75° F. are shown in FIG. 8. These values may be stored in look-up tables as discussed with reference to FIG. 6.

Figure 9:
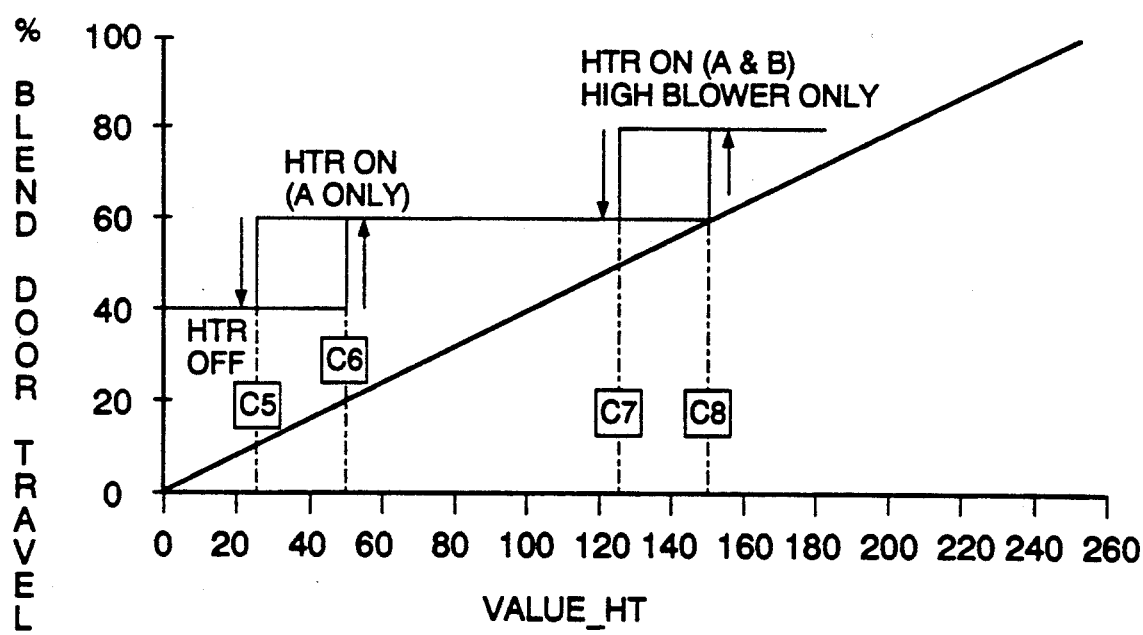
FIG. 9 is a chart of blend door position and PTC heater element energization versus VALUE_HT.

Using TSET and Equation (4), the ECM 50 calculates a VALUE_HT to determine the blend door position and PTC heater power level required to obtain TSET as shown in FIG. 9.

$$VALUE\_HT = OFFSETHT + K1*(TSET - TSETMAX) + K2*(TSETMAX - TAMB) + K3*(TSET - TINCAR) \quad (4)$$

Where:
OFFSETHT = 0 to 255 calibration constant
K1, K2, K3 = 0.0 to 10.0, calibration constants
TAMB = Ambient temperature
TINCAR = In-Car temperature The switch points C5 and C6 establish the VALUE_HT at which segment A of the PTC heater is turned OFF and ON respectively. The switch points C7 and C8 establish the VALUE_HT at which segment B of the PTC heater is turned OFF and ON respectively. At a VALUE_HT of 150 or higher both segments A and B are energized. If VALUE_HT drops to 125 segment B is deenergized and if VALUE_HT drops to 25, segment A is deenergized.

A discharge temperature sensor 68 provides an input to the ECM 50 related to the temperature of the air discharged (DAT) into the interior of the vehicle from the heater plenum. If DAT exceeds a recommended limit, of for example 200° F. (DATMAX), the following term is subtracted from Equation (4) to decrement VALUE_HT.

$$K4*(DAT-DATMAX)$$

Figure 10:
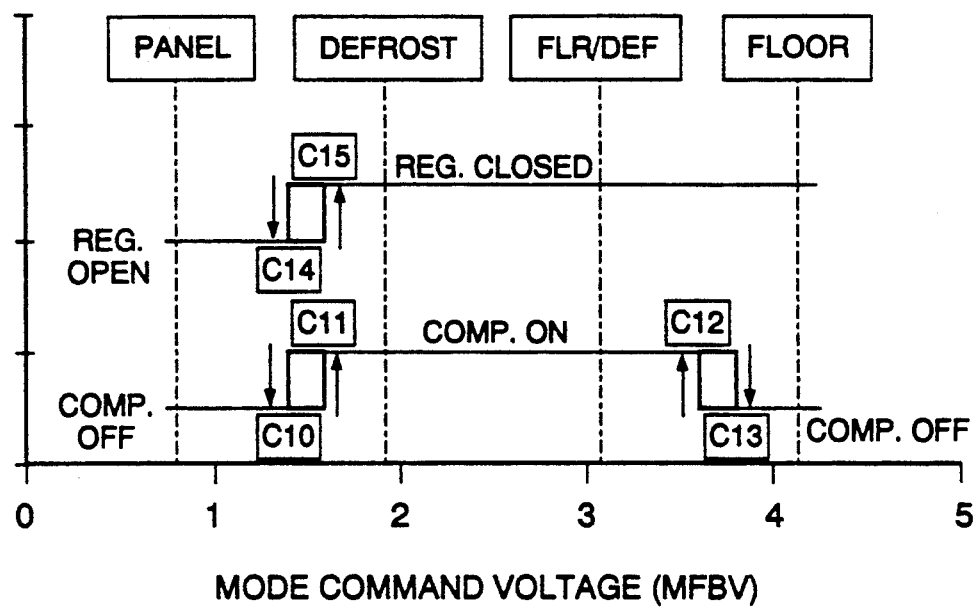
FIG. 10 shows the position of the air flow registers and the state of the compressor for the various modes of operation as determined by the mode control position command voltage.

Where:
K4=0.0 to 10.0, calibration constant
DAT=Discharge Air Temperature)
DATMAX=Maximum discharge air temperature The command voltage input MFBV from the MODE selector sends a signal to the ECM 50 to determine when to open and close the panel registers, when to run the A/C compressor and when to energize the heater. The vehicle instrument panel registers are controlled by an actuator 76. FIG. 10 shows the MODE command voltage associated with each of the modes of operation selectable by the operator. FIG. 10 also shows the ON/OFF status of the compressor and the OPEN/CLOSED status of the panel registers for the various modes of operation. C10, C11, C12, and C13 establish the switch points for the compressor while C14 and C15 establish the switch points for the panel registers.

Figure 11:
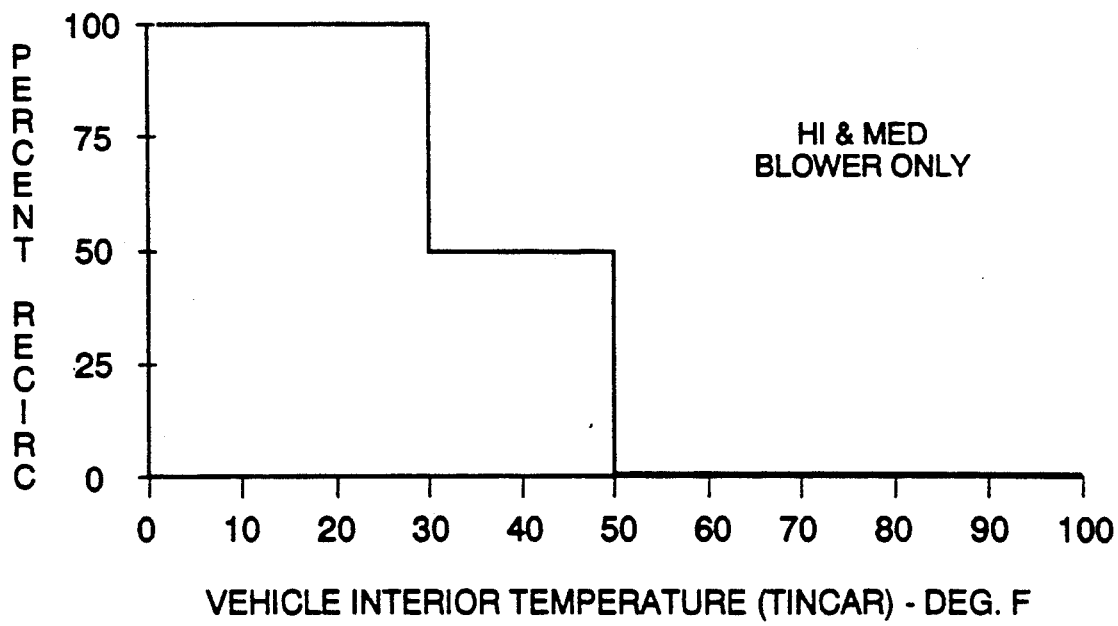
FIG. 11 is a chart of the percent of recirculated air versus vehicle interior temperature.

With reference to FIG. 10, the PANEL mode is selected by positioning the mode selection knob to the PANEL position and selecting the blower speed setting which causes the ECM 50 to discharge heated air out of the panel registers. The compressor will operate if the A/C button is actuated. The DEFROST or the FLR/DEF mode is obtained by selecting the appropriate position with the mode knob. In either of these mode the ECM 50 delivers heated air to the windshield, the panel registers are closed and the compressor is run at low speed to improve windshield defogging. The FLOOR mode is obtained by selecting the FLOOR position with the mode knob. In this mode the ECM 50 delivers most of the air to the floor outlets and the panel registers are closed. If the A/C button is actuated, the compressor is operated. A PANEL A/C or FLOOR A/C mode may be selected by the vehicle operator through the control assembly 52 by actuating the A/C button while the mode knob is in the PANEL or FLOOR position. If the blower speed is set to MED or HI, the ECM 50 will position the F/R door to use full or partial recirculated air as shown in FIG. 11. If the blower is set to LO, 100% raw outside air is supplied.

The ECM 50 controls the blower motor 26 through the blower motor drive module 70 in response to blower switch commands of OFF, LO, MED, and HI input by the operator from the control assembly 52. In the OFF mode the ECM 50 commands the actuator 62 to close the F/R door to minimize the entry of noxious odors into the vehicle and completely turns off all climate control components. When a blower speed is selected from the control assembly 52, the ECM 50 sends a duty cycle modulated pulse output signal to the module 70 to control the speed of the blower motor 26. The set of blower speeds to be used depends on the operating mode selected and may be contained in look-up tables in the memory of ECM 50. The module 70 is connected with a 12 VDC line and provides an input to the ECM 50 indicating whether an open or short circuit condition exist in the blower motor 26.

A throttle position sensor 72 monitors the position of the vehicle throttle and provides a signal to the ECM 50 whenever a wide-open throttle condition is present. When a wide-open throttle condition occurs the ECM turns off the heater or compressor for a predetermined time interval as will be explained further hereinafter.

Charging of the traction batteries from a commercial or residential power supply outlet is controlled and the state of charge is monitored by control and monitor 74. Two inputs are provided to the ECM 50 from the monitor 74. The first input advises the ECM when the battery power drops to a predetermined level, for example 10%, of full capacity. Under such circumstances, it is prudent to forego operation of the climate control system except under circumstances where safety dictates continued operation such as when the DEF or FLR/DEF mode is commanded for defogging the windshield. The other input advises the ECM whether the traction batteries are fully charged.

A solar vent duct assembly generally designated 78 includes an actuator motor, door, solar vent module, vent fan motor, limit switch, and temperature switch. The assembly 78 is disabled by the ECM 50 under normal vehicle operating conditions or when the pre-cool/pre-heat operation is in progress. Otherwise, if the in-vehicle temperature exceeds a predetermined upper temperature the actuator motor opens the door and the temperature switch in the assembly allows the vent fan to run until the temperature falls to a predetermined lower temperature at which time the vent fan is stopped and the door is closed.

The pre-cool/pre-heat switch (PC/PH) provides, when actuated, a signal which wakes up the ECM 50 to initiate the pre-cool/pre-heat process. If the interior temperature is cooler than 75° F. the pre-heat function is initiated. If the interior temperature is warmer than 75° F., the pre-cool function is initiated. The pre-cool/pre-heat function operates for a maximum of eight hours. If the pre-cool function is initiated, the ECM 50 assumes that the set temperature (TSET) corresponds to the COOL position of the TEMP selector, sets the blower to MED, opens the panel registers and initiates the normal A/C mode of operation. If the preheat function is initiated, the ECM 50 assumes that the set temperature (TSET) corresponds to the WARM position of the TEMP selector, sets the blower to MED, closes the panel registers and initiates the normal heater mode of operation.

Figure 12A:
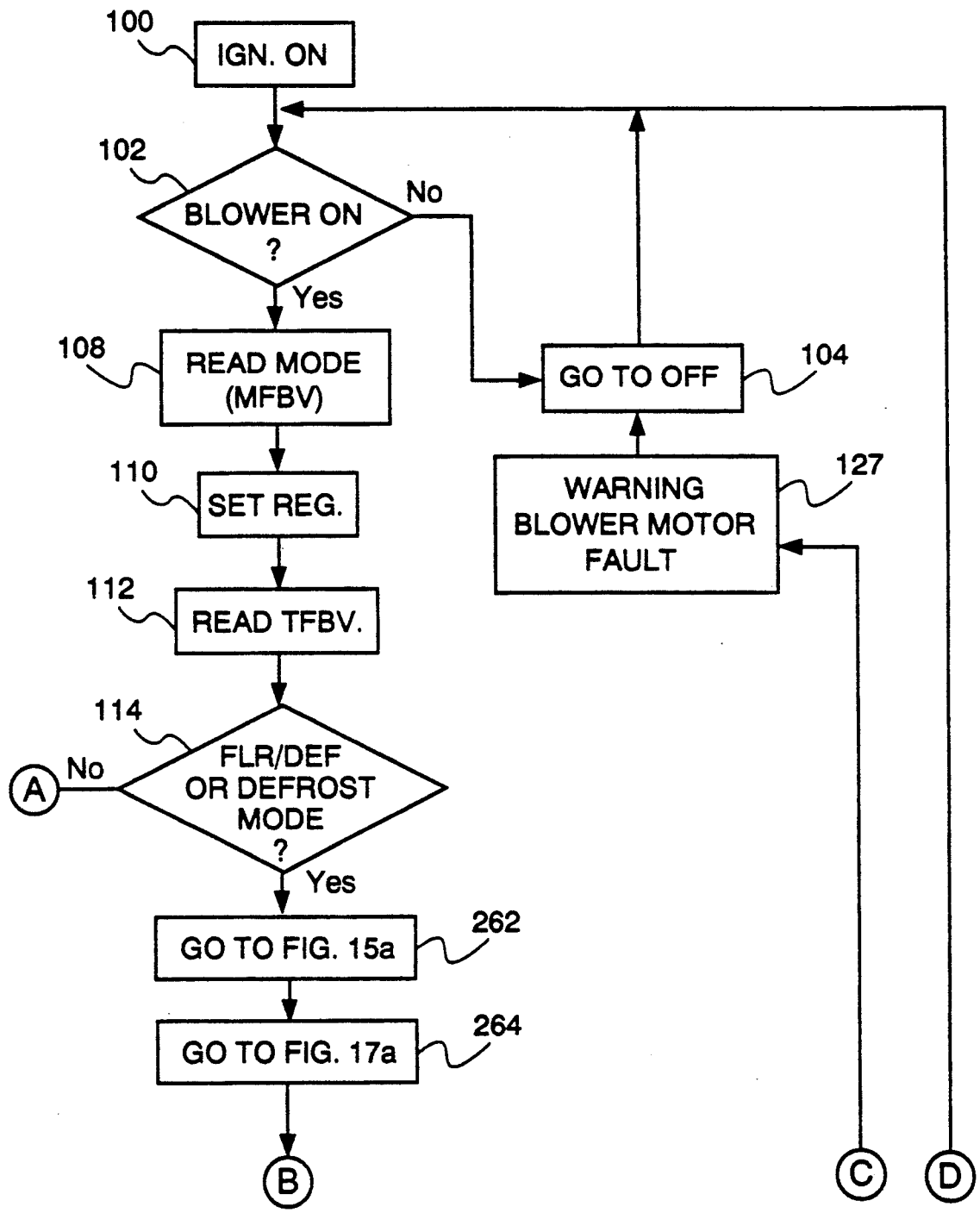
FIGS. 12a and 12b are an overall flow chart of the climate control system of the present invention.
Figure 12B:
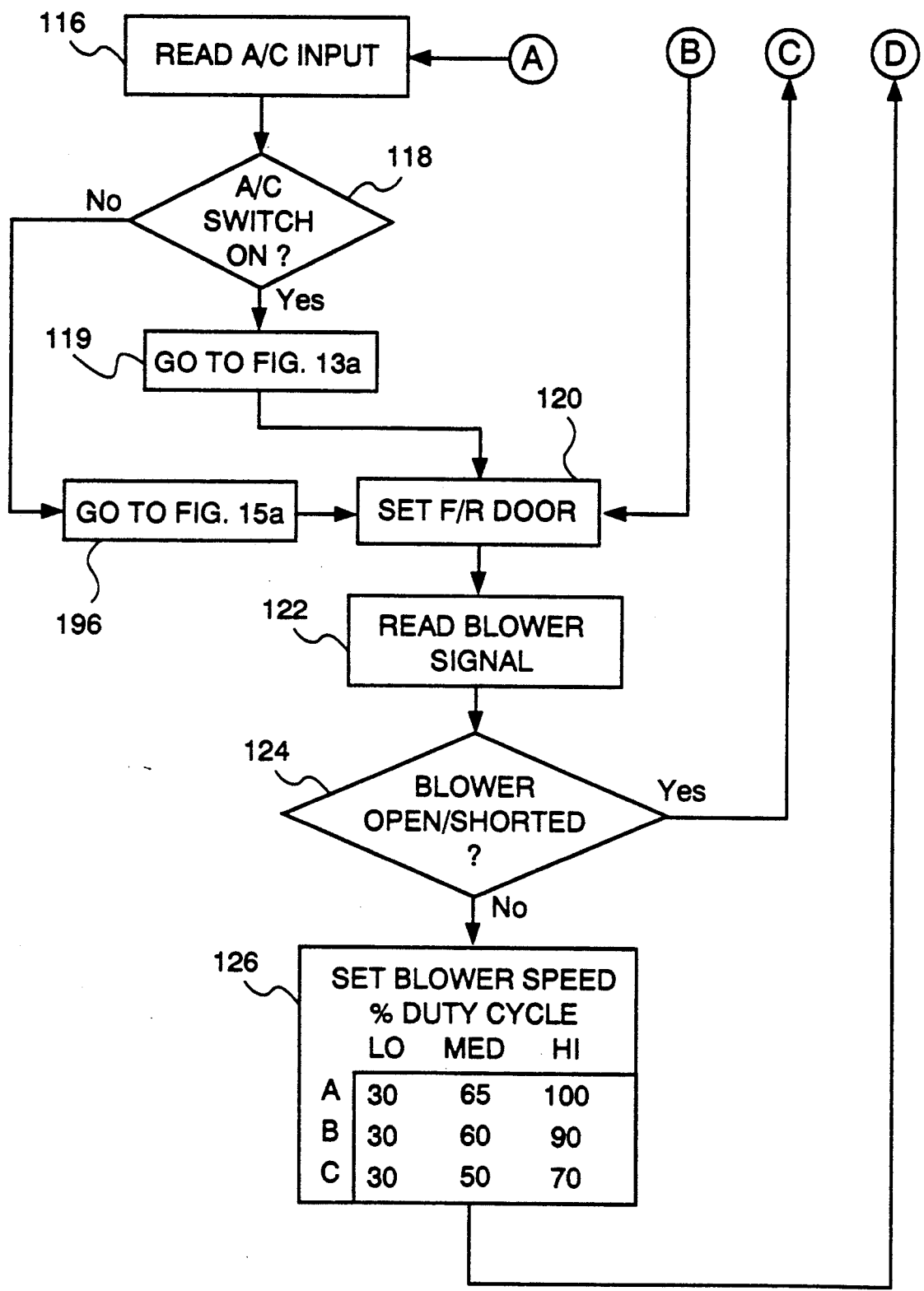

Referring now to FIGS. 12a and 12b, a flow chart of the program controlling the operation of the ECM 50 is shown. Steps in the flow chart are identified by a numeral within angle brackets. Whenever, the ignition switch is ON <100>, the ECM reads the blower fan command input to determine <102> if the blower switch is ON, that is to say, in the LO, MED or HI positions. If the blower switch is in the OFF position the system enters the blower OFF mode <104> where the F/R door is set to the Recirculate position. When a Lo, MED, or HI blower speed command is detected, the MODE feedback voltage is read <108> to determine the MODE commanded by the operator. If the PANEL mode is selected the position of the instrument panel registers are set <110> to an OPEN position, to discharge air from the panel registers, otherwise the registers are set to a CLOSED position and the TEMP selector command voltage is read <112>.

Figure 15A:
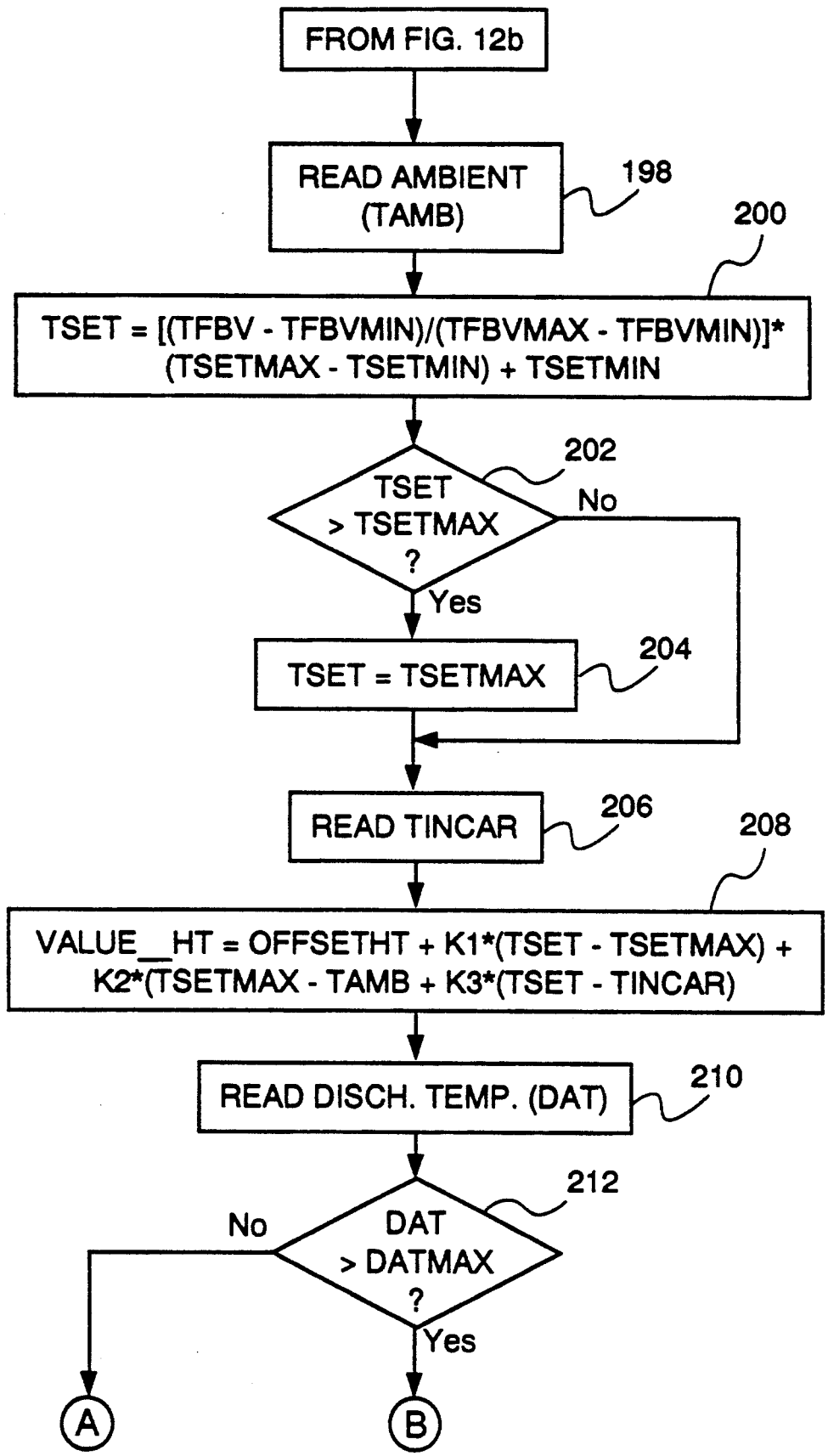
FIGS. 15a and 15b are flow charts showing the calculation and modification of VALUE_HT and the PTC heater operation.
Figure 17A:
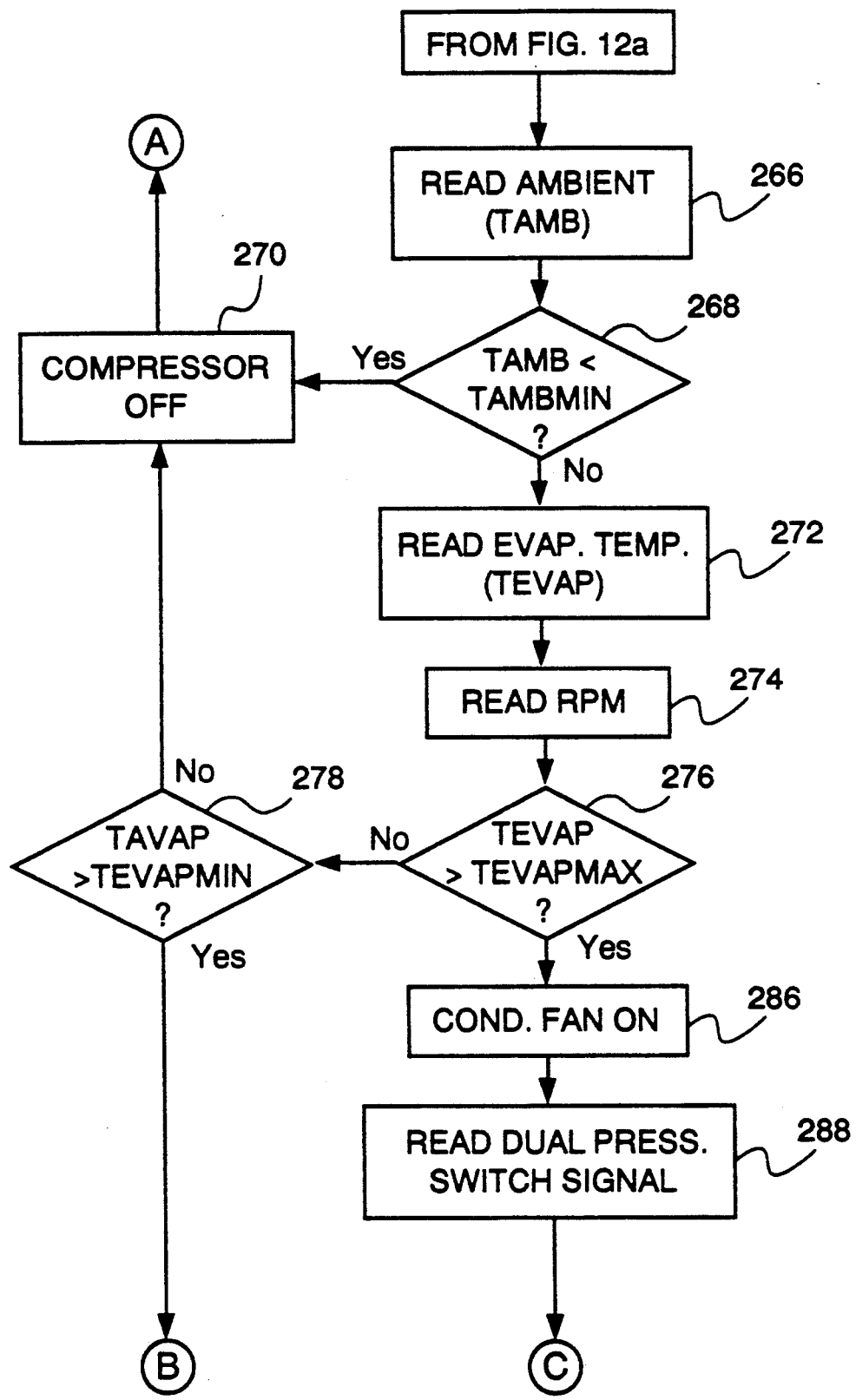
FIGS. 17a and 17b are flow charts showing the compressor operation during the DEFROST and FLR/DEF modes.
Figure 17B:
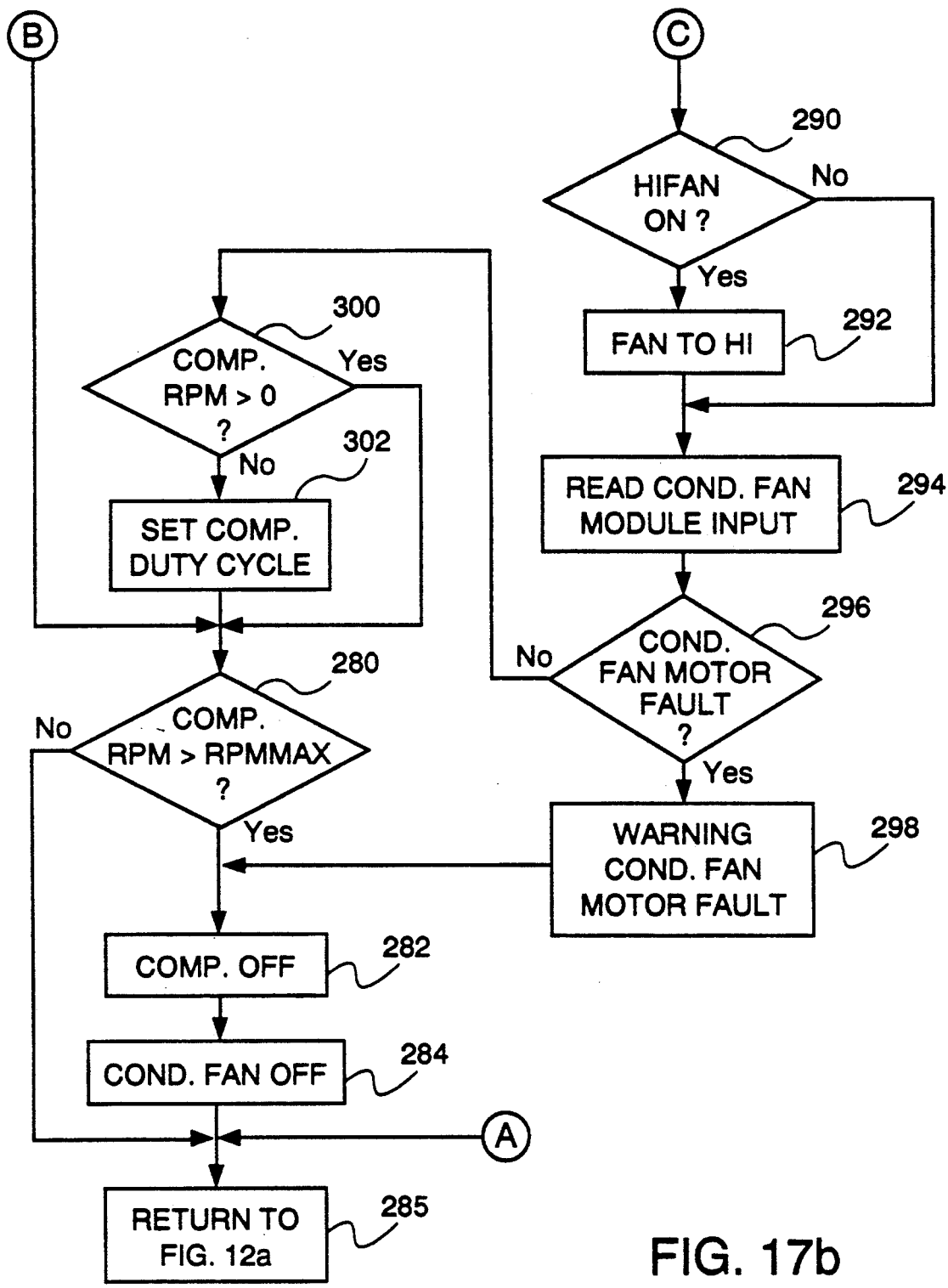

If the FLR/DEF or DEFROST mode is commanded <114> the routine depicted by the flow chart in FIG. 15a is invoked to calculate a VALUE_HT and to control the PTC heater and thereafter the routine depicted by the flow chart in FIGS. 17a and 17b is invoked to control the speed of the compressor motor 8 and condenser fan motor 16 as will be described more fully hereinafter.

Figure 13A:
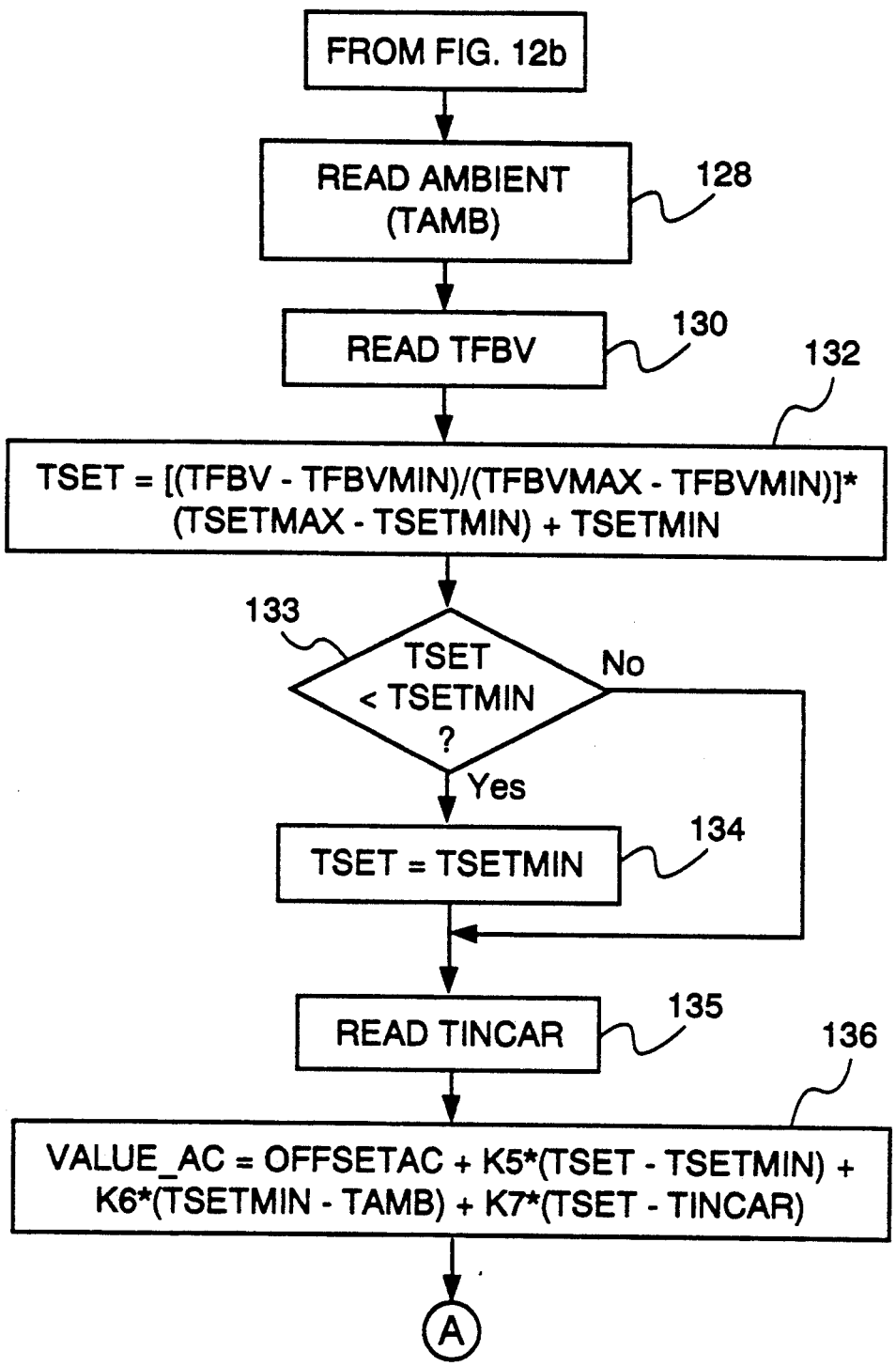
FIGS. 13a and 13b are flow charts showing the calculation and modification of VALUE_AC.

If the PANEL or FLOOR mode has been commanded <114>, the position of the A/C switch is read <116> and if the A/C switch is ON <118> the routine depicted by the flow chart in FIG. 13a is entered to calculate TSET and VALUE_AC and to control the duty cycle of the compressor motor 8 and condenser fan motor 16. If the A/C switch is OFF <118>, then the routine depicted by the flow chart in FIG. 14a is entered to calculate a VALUE_HT and to control the heater 36.

AIR CONDITIONING OPERATION

In the PANEL or FLOOR mode, if the A/C switch is ON <118>, then as shown in FIG. 13a, the ambient temperature is read <128>, the TEMP command voltage is read <130>, and the set temperature, TSET, is calculated <132> based on Equation 1. If TSET is less than TSETMIN <133>, for example 75° F., then TSET is limited <134> to 75° F. The in-car temperature is read <135> and VALUE_A/C is calculated at <136> in accordance with Equation 2. The RPM of the compressor is read <138> and if greater than a maximum RPM <140>, of for example 7000 RPM, VALUE_A/C is increased <142> by a factor related to the difference between the compressor RPM and the maximum value. Regardless of the compressor speed, the evaporator temperature is read <144> and compared <146> with a maximum temperature of, for example 50° F. If the evaporator temperature is less than the maximum, the VALUE_A/C is increased <147> by an amount related to the difference between the maximum and the actual temperature of the evaporator.

Figure 14A:
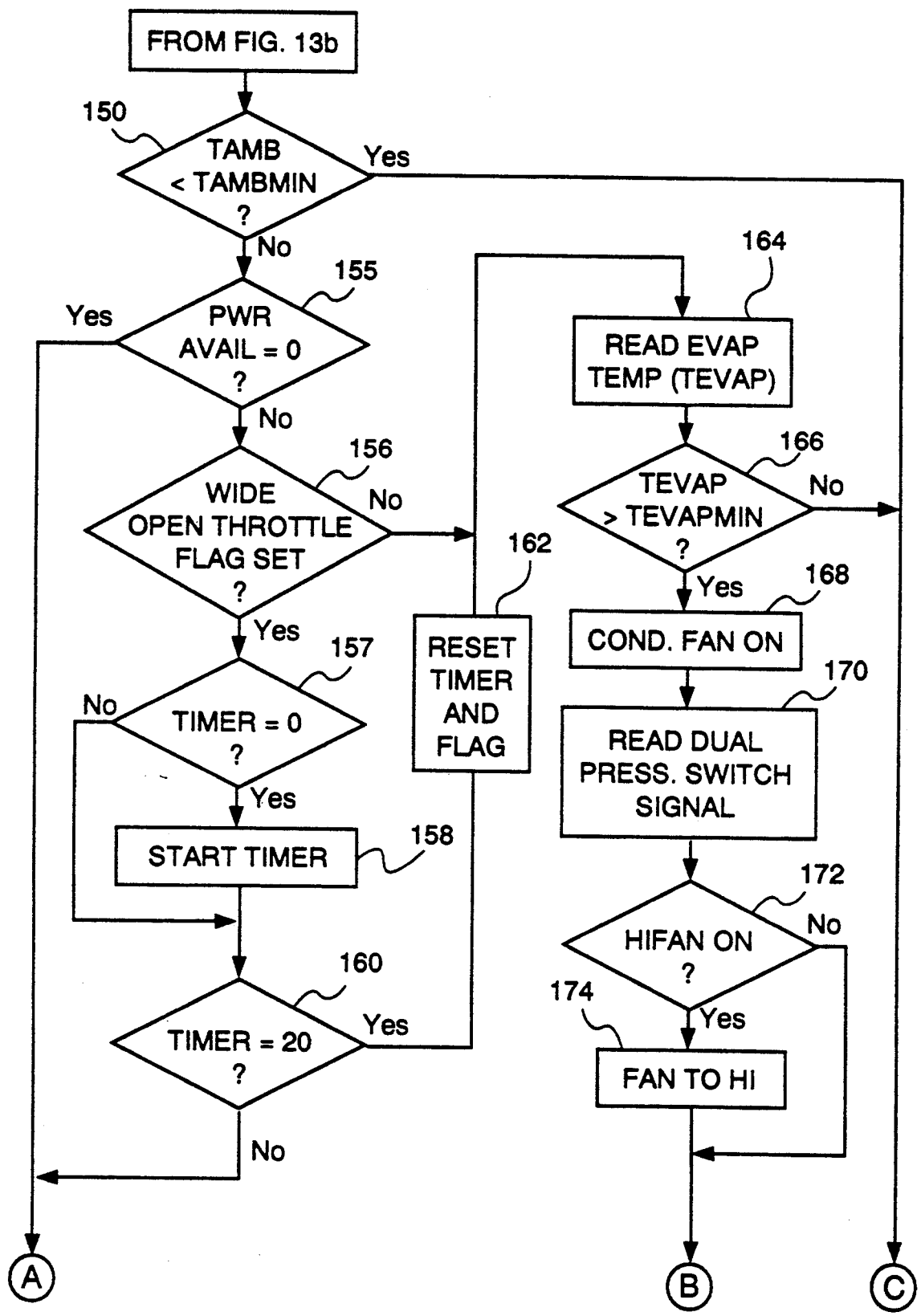
FIGS. 14a and 14b are flow charts showing the operation of the compressor during the PANEL and FLOOR modes.
Figure 14B:
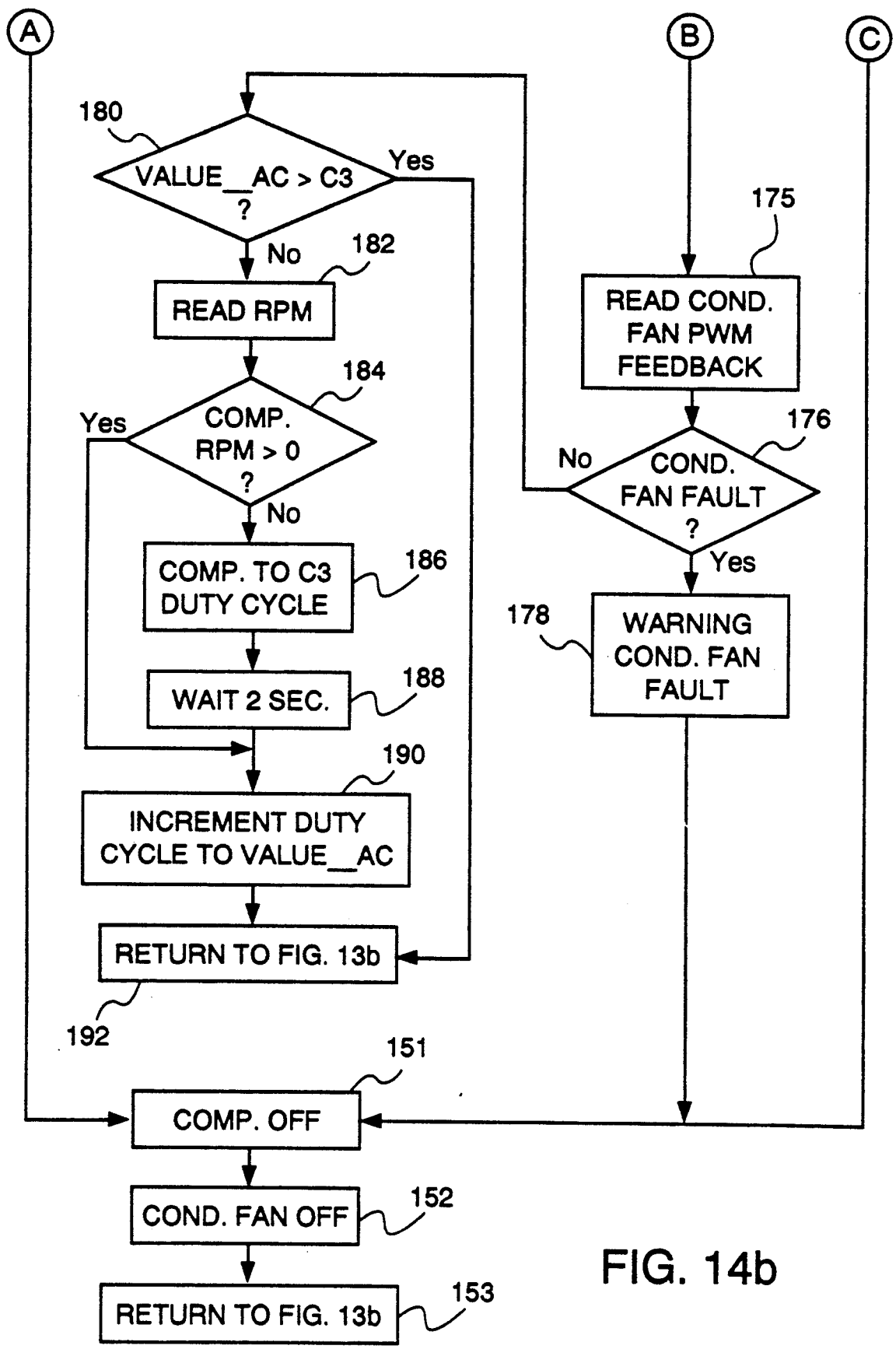

After modifying VALUE_AC as necessary for compressor RPM and evaporator temperature thresholds, the blend door is set to the maximum cool position <148> and the routine depicted in the flow chart in FIG. 14a is entered from block <149>. In this routine the compressor motor duty cycle and condenser fan motor duty cycle is determined as a function of operating conditions such as ambient temperature, throttle position, evaporator temperature and refrigerant pressure.

Figure 13B:
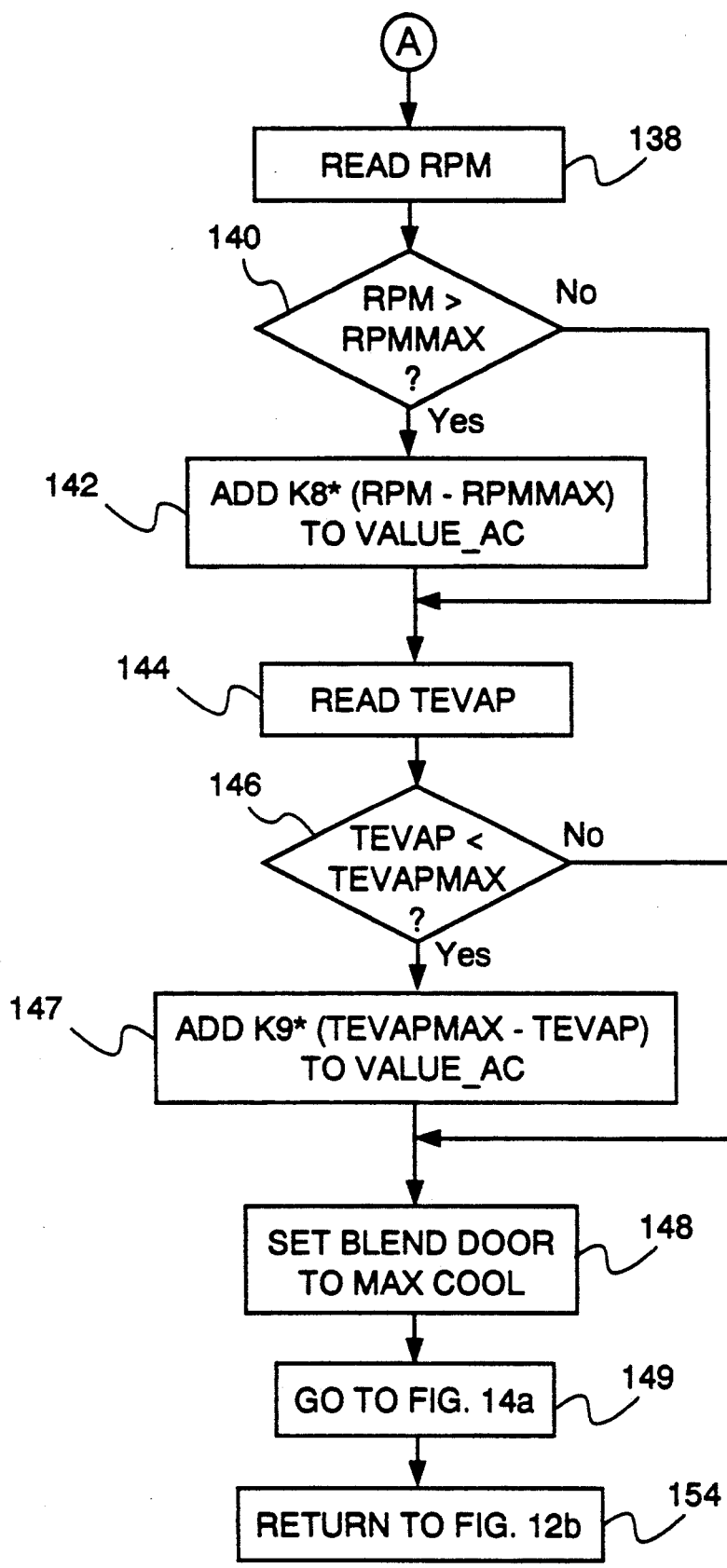

Referring now to FIG. 14a, the ambient temperature is compared <150> with a minimum of, for example 50° F., and if less than the minimum, the compressor motor is turned OFF <151> and the condenser fan motor is turned OFF <152> and control returns <153> to block <149> of FIG. 13b and from there returns <154> to FIG. 12b. If the ambient temperature is equal to or greater than the minimum ambient of 50° F., then the power available for climate control operation is checked <155> and the compressor motor and condenser fan motor are turned OFF if the battery voltage has dropped below a predetermined charge state where it is not prudent to use power for passenger comfort.

If sufficient power is available for climate control operation, then a check is made <156> of whether a flag, indicating a wide-open throttle condition has occurred, is set. At <157> through <162> a 20-second timer is started when a wide-open throttle condition is first detected. During the 20-second interval following an initial detection of wide-open throttle, the compressor and condenser fan are maintained in an OFF condition. After the 20-second interval, the timer and the wide-open throttle condition flag are reset.

If a wide-open throttle condition does not exist, or the timer has expired following the detection of a wide-open throttle condition, then the evaporator temperature is read <164> and compared <166> with a minimum evaporator temperature of, for example, 45° F. If the evaporator temperature is not greater than the minimum, then the compressor motor and condenser fan motor are placed in the OFF condition <151>, <152>. If evaporator temperature is greater than the minimum, then the condenser fan motor is turned ON <168> and the HIFAN signal is read <170>. If the HIFAN signal is ON <172>, indicating that the compressor discharge pressure exceeds normal operating limits, then the condenser fan motor is set to 100% duty cycle <174> and the condenser fan motor feedback signal is read at <175>. If the input from the condenser fan motor module indicates a fault <176>, then a warning is displayed at <178> and the compressor motor and condenser fan motor are turned off at <151> and <152>.

If no condenser fan motor fault exists, VALUE_Y/C is compared <180> with the compressor switch point C3 indicated in FIG. 7, and if less than or equal to C3, the speed of the compressor motor is read at <182> in order to make a determination of whether the compressor is running <184>. If the compressor is not running, then the compressor speed is set to the duty cycle corresponding to the C3 switch point at <186>. After a 2-second wait interval <188> to permit the compressor motor speed to stabilize, the duty cycle is incremented, at a predetermined rate equal to, for example, 10% duty cycle per second, as indicted at <190> until the duty cycle corresponding to the calculated VALUE_AC is achieved. If the compressor motor is already running as determined at <184>, then the duty cycle is merely incremented at <190> as necessary. Once the compressor motor is incremented to the speed associated with the VALUE_A/C, then the routine returns at <192> to <149> in FIG. 13b and from there to <119> in FIG. 12b.

The F/R door is positioned at <120> of FIG. 12b as a function of VALUE_AC as depicted in FIG. 7. The blower drive module input is read at <122> and if the blower motor is neither in an open circuit or short circuit condition <124> the blower motor duty cycle is set, as a function of the commanded MODE and commanded blower speed input, to the values depicted in <126> where A=FLOOR mode, B=DEFROST or DEF/FLR mode, and D=PANEL mode. Otherwise a blower motor fault warning is displayed <127> and the blower OFF mode is entered at <104>.

HEATER OPERATION

If the A/C switch is not ON, then the program continues from <118> FIG. 12b to the routine depicted by the flow chart in FIG. 15a as indicated by the block <196>. Referring to the flow chart in FIG. 15a, the ambient temperature is read <198> and TSET is calculated <200> with TSETMIN equal to TAMB and TSETMAX equal to a predetermined temperature of, for example, 75° F. As indicated at <202> and <204>, TSET is limited to a maximum temperature setting of 75° F. when the operator commands maximum heat. At <206> the in-car temperature is read and VALUE_HT is calculated <208> in accordance with equation (4). The discharge temperature is read at <210> and if the discharge temperature is greater than <212> a maximum of, for example, 200° F., then the difference between the discharge temperature and the maximum discharge temperature times a calibration constant K4 is subtracted <214> from VALUE_H/T as indicated at <214>.

If insufficient power is available for climate control operation as determined by the decision block <216>, and the system is not in the DEFROST or FIR/DEF mode as determined by the decision block <218>, (which is the case in this scenario) the PTC heater is turned OFF at <220> and control returns at <222> to <196> in the flow chart in FIG. 12b.

Figure 16:
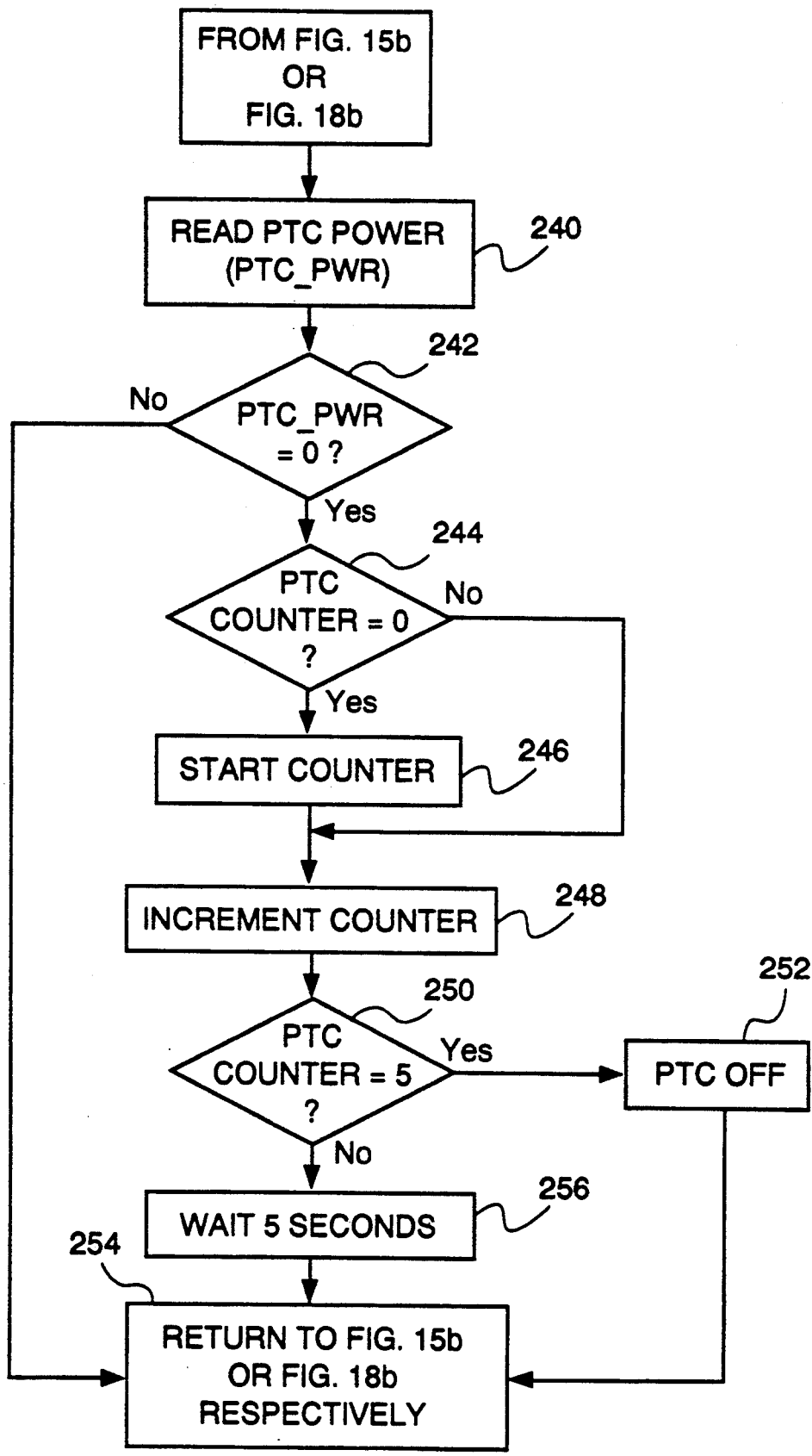
FIG. 16 is a flow chart showing the PTC heater short circuit test.

If sufficient power is available and a wide-open throttle condition flag is not set <230>, the elements of the PTC is turned ON <226> and the blend door position is set <228> all in accordance with FIG. 9, and the program goes <229> to the routine depicted in the flow chart of FIG. 16. If VALUE_HT is less than or equal to switch point C6, then the PTC heater is turned OFF <220> and control returns <222> to FIG. 12b.

If a wide open throttle condition flag is set as determined by the block <230>, then as determined by the blocks <232>, <234> and <236> the PTC heater is turned OFF <238> during a predetermined interval of time following the detection of the wide open throttle condition. When the wide open throttle timer period has expired, the timer and flag are reset <237> and the program returns to the path including blocks <224-229>.

Referring now to the routine depicted in the flow chart of FIG. 16, a PTC heater short circuit check is performed by reading <240> the PTC_PWR feedback signal from the PTC power module. If at block <242> it is determined that a short circuit condition exists the PTC heater is turned off as indicated by blocks <244-252> after 5 attempts are made to turn ON the heater core with an intervening 5 second wait <256> between attempts. Thereafter, or if the PTC_PWR feedback signal does not indicate a short circuit condition at <242>, the program returns <254> to block <229> of the routine in FIG. 15b and from there via block <222> to block <196> of FIG. 12b. The F/R door is positioned at <120> as a function of TINCAR and blower speed command input as depicted in FIG. 11 and if the blower fan motor is operative <122>, <124> the blower fan motor speed is set as indicated in block 126 of FIG. 12b.

DEFROST OPERATION

Figure 15B:
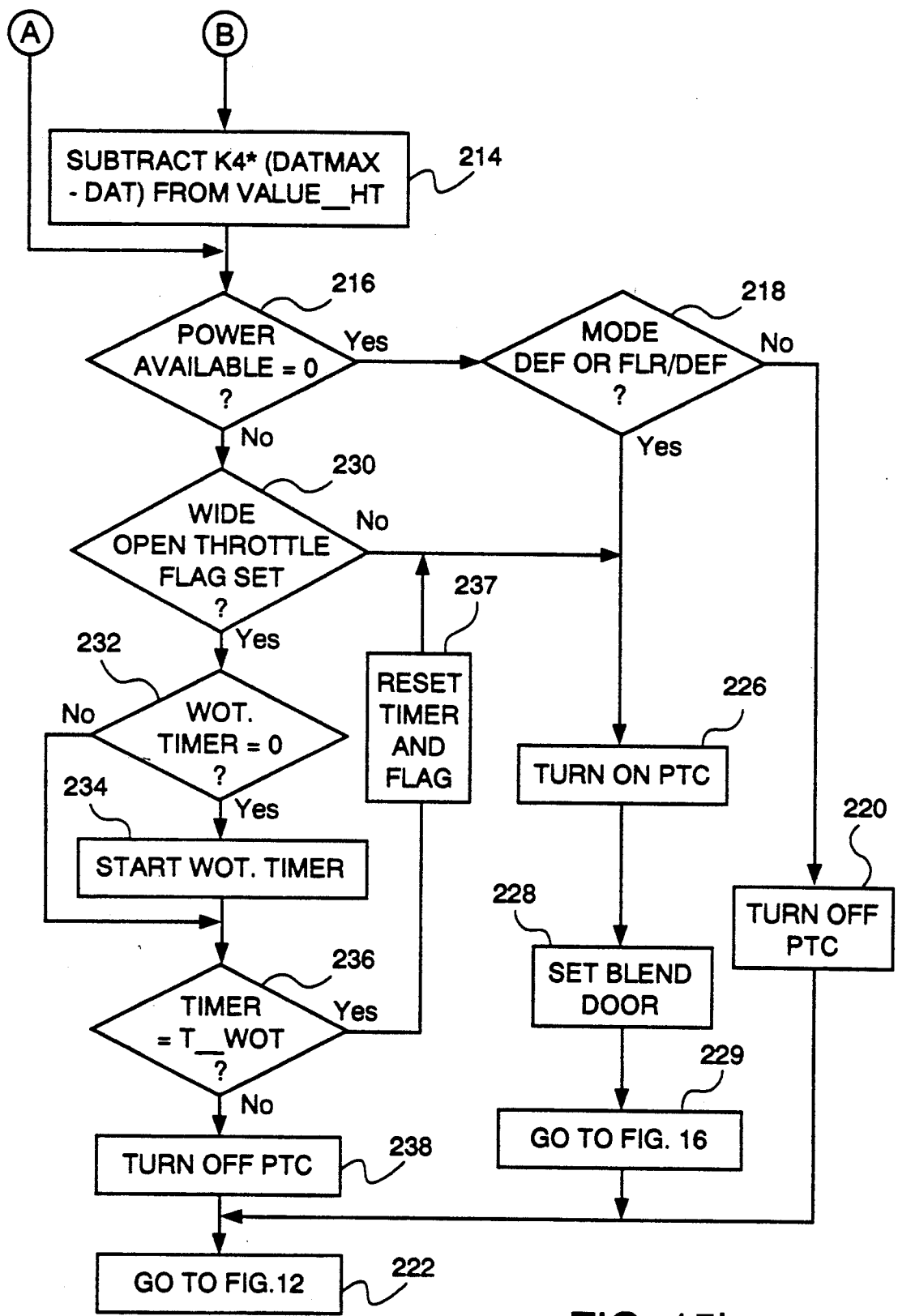

As previously mentioned, if the FLR/DEF or DEFROST mode has been selected as determined by the block <114> of FIG. 12a, then the heater control routine previously described and shown in FIGS. 15a, 15b, and 16 is entered <262>. After calculation <208> of VALUE_HT, the PTC heater is turned ON at block <226> of FIG. 15b, if the VALUE_HT is greater than C6 <224>, even if the power available is below the 10% level <216>, to permit defogging of the windshield. If power is available <216> the wide open throttle condition is checked and appropriate action taken as previously described. After appropriate setting of the heater, and completion of the short circuit test <229> in FIG. 16, the program returns <222> to block <262> of FIG. 12a and from there goes <264> to the routine depicted by the flow chart depicted in FIG. 17a to set the compressor motor operation under the DEFROST and FIR/DEF mode.

Referring now to the flow chart in FIG. 17a, the ambient temperature is read <266> and compared <268> with a minimum ambient temperature (TAMBMIN). If the ambient temperature is below TAMBMIN the compressor is turned OFF <270> and control returns to block <264> of FIG. 12a. If the ambient temperature is equal to or greater than TAMBMIN, the evaporator temperature is read <272> and the RPM of the compressor is read <274>. If the temperature of the evaporator is not greater than <276-278> a predetermined minimum temperature (TEVAPMIN) the compressor is turned OFF <270> and control returns to block <264> of FIG. 12a. If the evaporator temperature is greater than TEVAPMIN but less than or equal to a predetermined maximum evaporator temperature (TEVAPMAX) then the compressor RPM is compared at <280> in FIG. 17b, with a maximum compressor RPM and if greater than the maximum RPM, the compressor is turned OFF <282> and the condenser fan turned OFF <284>. In either event, the routine returns <285> to block <264> of FIG. 12a.

Returning again to block <276> of FIG. 17a, if the evaporator temperature is greater than TEVAPMAX, the condenser fan is turned ON <286> with a duty cycle of 50%. At <288-292>, the dual pressure switch signal (HIFAN) is read and if present, the fan is changed from a 50% duty cycle to a 100% duty cycle. In either event, the input signal from the condenser fan module is read at <294> and if a motor fault exists as determined by the block <296>, a warning is provided at <298> and the compressor and condenser fan motor are turned OFF and control returns <285> to block <264> of FIG. 12a. If no fault exist, and the compressor is already running as determined by block <300>, the compressor RPM is compared to a maximum RPM as previously described with respect to block <280>. If the compressor is not running, then the duty cycle of the compressor is set in block <302> to a fixed low speed of, for example, 35% duty cycle and control returns to block <264> of FIG. 12a by way of blocks <280> and <285>.

PRE-COOL/PRE-HEAT OPERATION

The pre-cool/pre-heat (PC/PH) operation is depicted by the flow charts in FIGS. 18a-18d and is intended to pre-condition the vehicle interior temperature as needed during any 8 hour period in which the ignition switch is OFF, the PC/PH switch is activated, the vehicle is connected with an external 220 VAC power supply, and the traction batteries are fully charged. PC/PH operation will cease if any of these conditions no longer exist.

If the ignition is OFF as determined at <310> and the pre-cool/pre-heat switch has been activated <312>, then an 8-hour timer is started at <314>, <316> and the in-car temperature and ambient temperature are read at <318>, <320>, respectively. If the in-car temperature is less than a predetermined minimum temperature (TPCPHMIN), as determined by the block <322> then a preheat operation occurs. TSET is set equal to TSETMAX <330> and VALUE_HT is calculated <332>. VALUE_HT is then reduced at blocks <334-338> if the discharge temperature is greater than a maximum discharge temperature of, for example, 200° F. If the discharge temperature is below the maximum or after the reduction of VALUE_HT, the F/R door is set, as is the blower motor duty cycle at <340> as previously indicated in the discussion of blocks <120> and <126> in FIG. 12b. The PTC heater is turned ON <344> and the PTC short circuit test previously described with reference to FIG. 16 is entered at <346>.

Figure 18A:
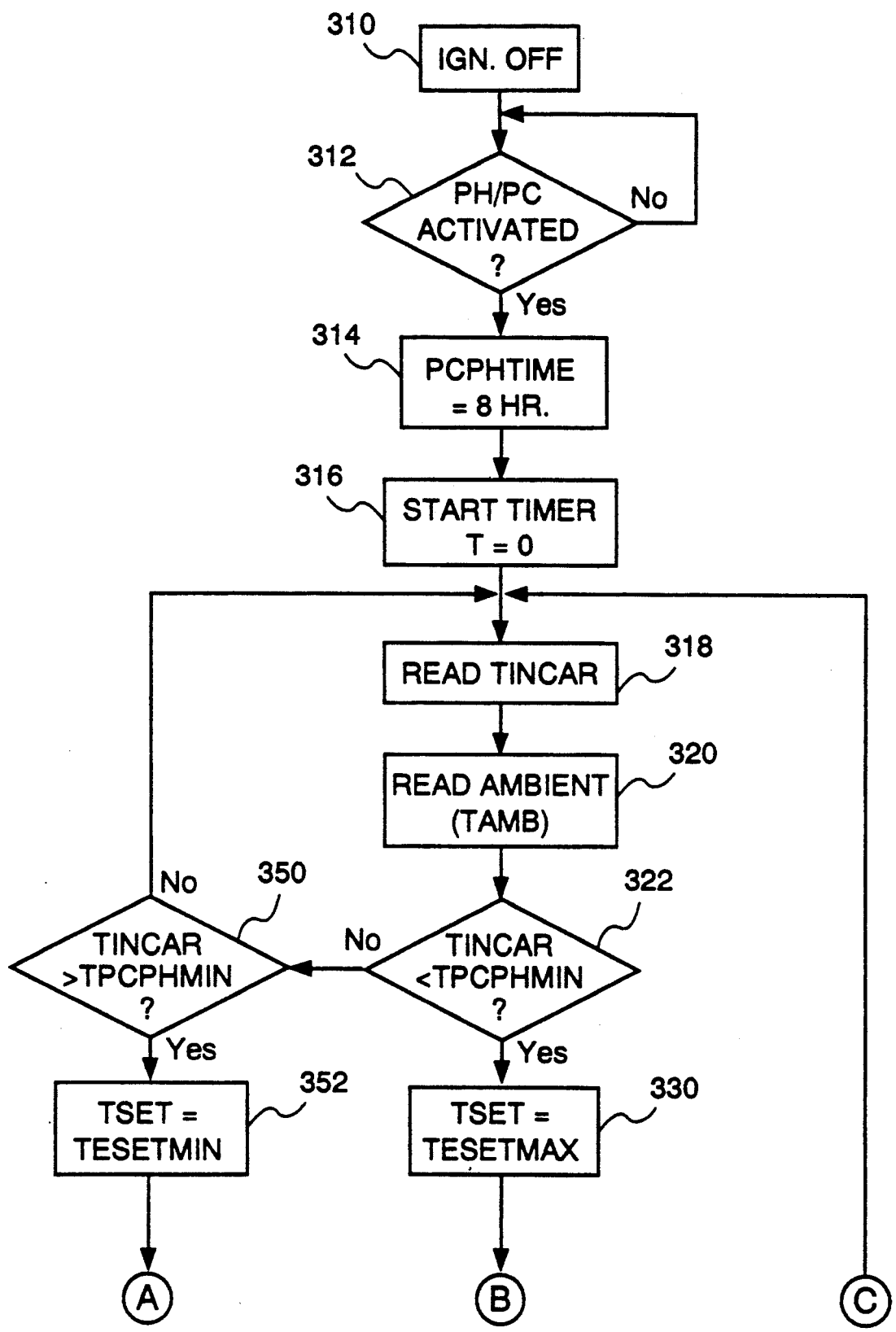
FIGS. 18a–18d are flow charts showing the precool/pre-heat mode of operation of the climate control of the present invention.
Figure 18B:
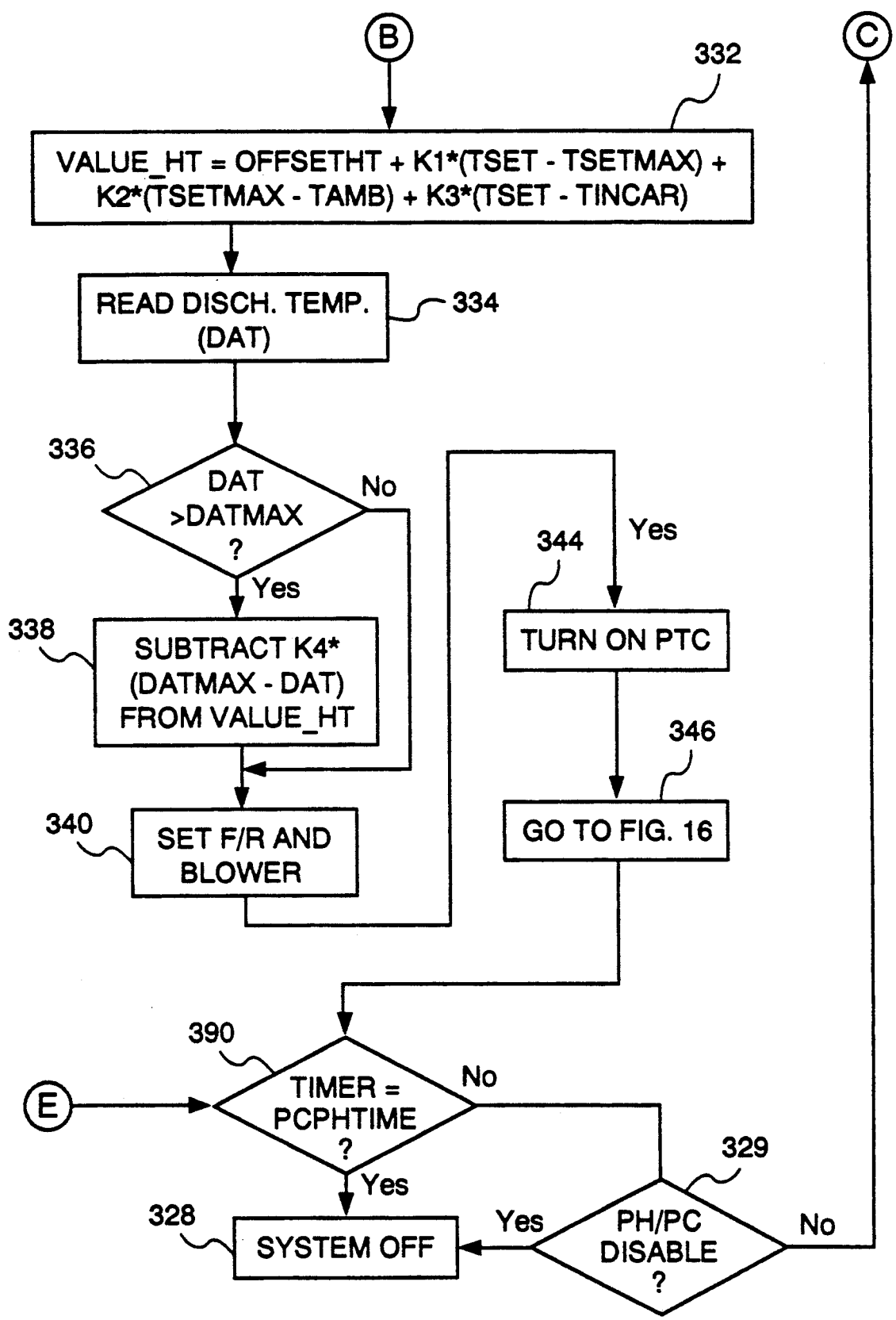
Figure 18C:
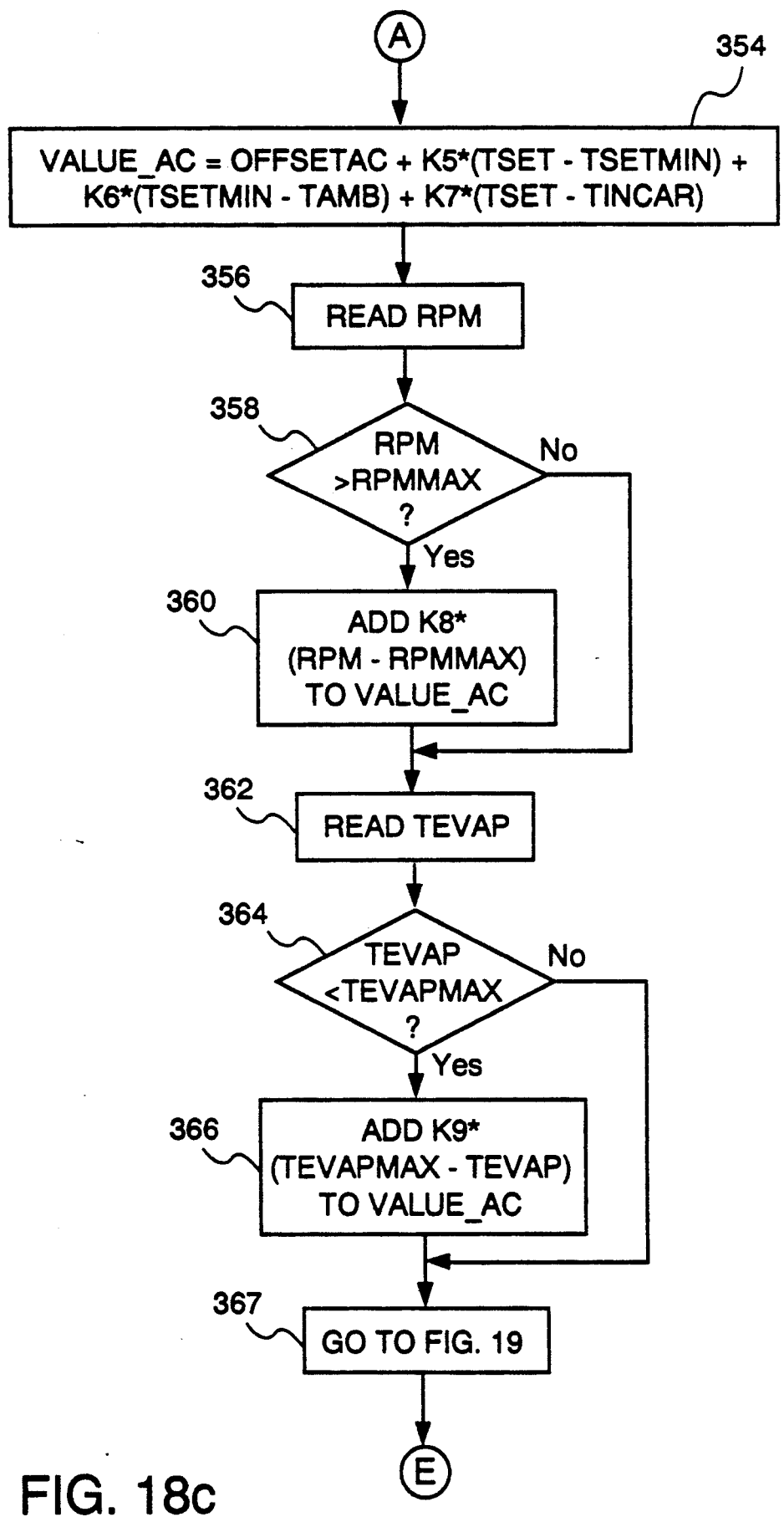
Figure 18D:
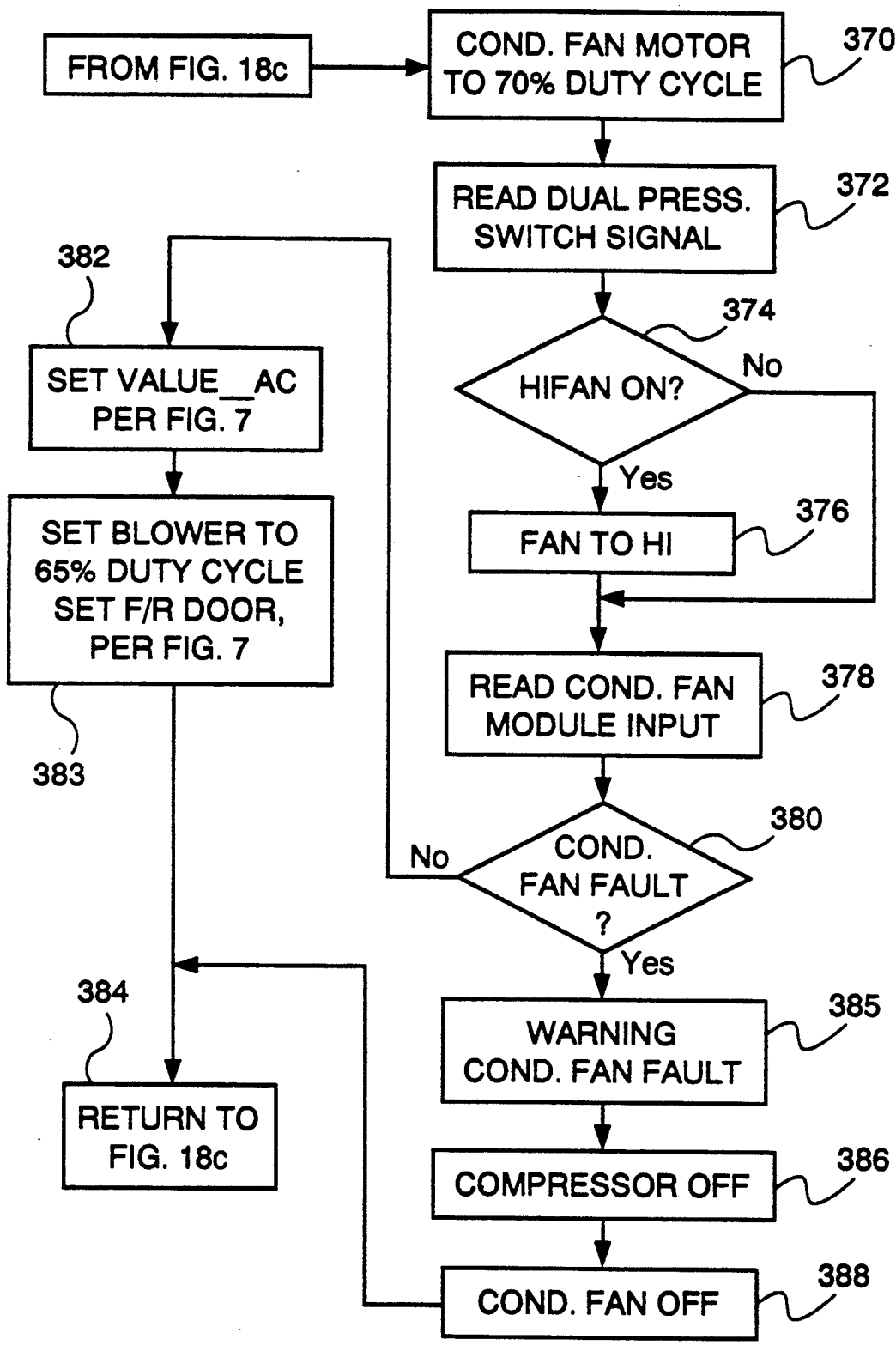

If the in-car temperature is not less than TPCPHMIN as determined by the block <322> of FIG. 18a, but is greater than a predetermined maximum temperature (TPCPHMAX), of for example 80° F., as determined by the block <350>, then cooling of the interior occurs. TSET is set to TSETMIN (75° F.) at <352> and VALUE_AC is calculated at <354> in FIG. 18c. VALUE_AC is increased where the RPM of the compressor is greater than a maximum RPM of, for example, 7000 RPM as indicated in the blocks <356-360>. VALUE_AC is increased if the temperature of the evaporator is less than TEVAPMAX (50° F.) as indicated in the blocks <362-366> and the routine in FIG. 18d is entered at <367>. Referring to FIG. 18d, the condenser fan is set to a duty cycle of 70% in block <370> and the dual pressure switch is read at <372>. If the HIFAN signal is present <374>, the fan is set to a 100% duty cycle as indicated at <376> and the condenser fan module input signal is read at <378> to determine if a condenser fan fault exists. If no fault exists as determined by the block <380>, then the VALUE_AC is set <382> to a value that will turn the compressor ON at a 65% duty cycle and set the F/R door to a recirculate position as indicated by the block <383> and operation returns <384> to block <367> in FIG. 18c. If a condenser fan fault exist as determined in block <380>, then a warning is displayed <385> to the vehicle operator and the compressor and condenser fan are turned OFF at <386> and <388>, respectively and operation returns <384> to block <367> in FIG. 18c and thence to block 390 of FIG. 18b. If the 8-hour timer has expired as determined at <390> the system is turned OFF at <328>. If the 8-hour timer has not expired the PH/PC disable decision block is checked at <329> to determine whether the conditions for a pre-heat or pre-cool operation still exists and if so the routine continues at block <318> of FIG. 18a. If PH/PC operation has been disabled the system is turned OFF at <328>.

Having described our invention what we claim is:

1. A climate control system for a vehicle comprising a closed refrigerant system including variable speed compressor means, said control system further comprising vehicle operator input means for selecting a desired interior temperature, ambient air sensor means for monitoring the temperature of the ambient air, in-vehicle sensor means for monitoring the temperature of the interior of the vehicle, programmable computer means programmed to determine a set temperature value related to said desired temperature but limited to a value between a fixed predetermined minimum temperature value and a variable maximum temperature value equal to the temperature of the ambient air, said computer means being further programmed to determined an air conditioning value related to the difference between said set temperature value and the temperature of the interior of the vehicle as provided by said in-vehicle sensor means and for controlling the speed of said compressor means as a function of said air conditioning value.

2. The invention defined in claim 1 wherein said refrigerant system further comprises an evaporator means located within air delivery means which communicate with the interior and exterior of the vehicle, blower fan means including a blower fan for blowing air over said evaporator means and further including a blower fan motor for operating said fan, said input means further comprising mode selection means for selecting a mode of system operation and blower fan selection means for selecting a blower fan speed range, said computer means being further programmed to select the speed of said blower fan motor means as a function of the mode selected and blower fan speed range selected.

3. The invention defined in claim 2 wherein said air delivery assembly includes damper means for selecting air from the outside of the vehicle or recirculated air from the interior of the vehicle to be blown over said evaporator means by said blower fan means, said computer means controlling said damper means to switch between recirculated air and outside air at first and second predetermined air conditioning values.

4. The invention defined in claim 3 further comprising means for sensing the rotational speed of said compressor, said computer means being programmed to modify said air conditioning value to decrease the speed of said compressor means when the sensed rotational speed exceeds a predetermined value.

5. The invention defined in claim 4 further comprising means for sensing the temperature of said evaporator means, said computer means being programmed to modify said air conditioning value to decrease the speed of said compressor means when the temperature of said evaporator means drops below a predetermined temperature.

6. The invention defined in claim 5 further comprising condenser means, condenser fan means including a condenser fan driven by a variable speed condenser fan motor, throttle position sensing means for providing a signal to said computer means identifying a wide open throttle condition, said computer means being programmed to de-energize said compressor means and said condenser fan means for a predetermined interval of time following receipt of said signal.

7. The invention defined in claim 6 wherein said computer means is further programmed to de-energize said compressor means and said condenser fan means if the temperature of said evaporator means is less than or equal to a predetermined minimum temperature.

8. The invention defined in claim 5 further comprising pressure sensing means for generating a HIFAN signal if the discharge pressure of said compressor means exceeds a predetermined pressure limit, said computer means being programmed to normally operate said condenser fan motor at different speeds as a function of the mode selected by the operator but being responsive to said HIFAN signal for overriding said normal operation and operating said condenser fan motor at a predetermined upper speed limit.

9. The invention defined in claim 5 wherein said computer is programmed to respond to an air conditioning value determination less than a third predetermined air conditioning value to initially energize said compressor means at a minimum operating speed corresponding to said third predetermined air conditioning value and to thereafter gradually increase the speed of said compressor means by decrementing said air conditioning value until the speed of said compressor means corresponds to said air conditioning value determination.

10. A climate control system for a vehicle comprising heater means, blend means for controlling the mix of air heated by said heater means with cooler air, said blend means including a blend door and blend door actuator, said system further including vehicle operator input means for selecting a desired interior temperature, ambient air sensor means for monitoring the temperature of the ambient air, in-vehicle sensor means for monitoring the temperature of the interior of the vehicle, programmable computer means programmed to determine a set temperature value related to the desired temperature selected but limited to a value corresponding to a temperature between a fixed predetermined maximum temperature and a variable minimum temperature values equal to the temperature of the ambient air, said computer means being further programmed to determined a heating value related to the difference between said set temperature value and the temperature of the interior of the vehicle as provided by said in-vehicle sensor means,, said computer means being programmed to turn said heater means on at a first predetermined heating value and for controlling said blend door actuator to adjust the position of said blend door as a function of said heating value.

11. The invention defined by claim 10 wherein said heater means is formed of a positive temperature coefficient material and includes at least first and second segments, said first segment being energized in response to said first predetermined heating value to provide a relatively low heater output and said second segment being energized with said first segment in response to a second higher predetermined heating value to provide a relatively high heater output.

12. The invention defined in claim 10 further comprising a temperature sensor for sensing the temperature of the air discharged into the interior of the vehicle and wherein said computer is programmed to respond to a discharge air temperature greater than a predetermined discharge air temperature by reducing said heating value by an amount proportional to the amount that said discharge air temperature exceeds said predetermined discharge air temperature.

13. The invention defined in claim 12 further comprising throttle position sensing means for providing a signal to said computer means identifying a wide open throttle condition, said computer means being programmed to de-energize said heater means for a predetermined interval of time following receipt of said signal.

14. The invention defined in claim 13 further comprising means for detecting a short circuit condition in said heater and providing a short circuit signal to said computer means, said computer means programmed to respond to said short circuit signal by de-energizing said heater means for a predetermined time interval.

15. The invention defined in claim 10 wherein said climate control system further comprises a refrigerant system including a variable speed compressor, an evaporator, a condenser, condenser fan means, a blower fan for blowing air over said evaporator and further including a blower fan motor for operating said fan, ambient temperature sensor means, evaporator temperature sensing means, said input means further comprising mode selection means for selecting a mode of system operation and blower fan selection means for selecting a blower fan speed range, said computer means being programmed to control the speed of said blower fan motor means as a function of the mode selected and blower fan speed range selected, pressure sensing means for generating a HIFAN signal if the discharge pressure of said compressor means exceeds a predetermined pressure limit, wherein said computer means is programmed to operate said compressor at a predetermined relatively low speed if the ambient temperature is equal to or greater than a predetermined minimum temperature and the evaporator temperature is greater than a predetermined maximum temperature, and wherein said computer means is programmed to normally operate said condenser fan motor at different speeds as a function of the mode selected by the operator but is responsive to said HIFAN signal for overriding said normal operation and operate said condenser fan motor at a predetermined upper speed limit.

16. A climate control system for a vehicle comprising a closed refrigerant system including variable speed compressor means,
    said vehicle powered by traction battery means and including means for charging said traction battery means from an external alternating current supply,
    said vehicle further including ignition switch means, operator input means including switch means for selecting a pre-condition mode of operation, ambient air sensor means for monitoring the temperature of the ambient air, in-vehicle sensor means for monitoring the temperature of the interior of the vehicle,
    programmable computer means programmed to determined an air conditioning value related to the difference between a predetermined desired in-vehicle temperature and the temperature of the interior of the vehicle if;
    (a) the temperature of the interior of said vehicle exceeds a second higher predetermined temperature and,
    (b) the ignition switch means is OFF and,
    (c) the pre-condition mode has been selected and,
    (d) said traction battery means are fully charged,
    said computer means further programmed to control the speed of said compressor means over a predetermined interval of time as a function of said air conditioning value.

17. The invention defined in claim 16 wherein said system further includes a blower fan motor, a condenser fan motor and a blend door actuator, said computer means being further programmed to maintain predetermined blower fan motor and condenser fan motor speeds, and to energize said actuator to a maximum cool position.

18. The invention defined in claim 16 further comprising heater means including blower fan motor means,
    said programmable computer means being further programmed to determined a heating value related to the difference between a predetermined desired in-vehicle temperature and the temperature of the interior of the vehicle if;
    (a) the temperature of the interior of said vehicle drops below a second lower predetermined temperature and,
    (b) the ignition switch means is OFF and,
    (c) the pre-condition mode has been selected and,
    (d) said traction battery means are fully charged,
    said computer means further programmed to energize said heater means over a predetermined interval of time if said heating value exceed a predetermined heating value.

* * * * *